United States Patent
Watanabe et al.

(10) Patent No.: US 12,113,172 B2
(45) Date of Patent: Oct. 8, 2024

(54) POWER STORAGE DEVICE PRE-DOPING AGENT AND PRODUCTION METHOD FOR SAME

(71) Applicant: Tayca Corporation, Osaka (JP)

(72) Inventors: Keiichi Watanabe, Osaka (JP); Yuta Kakimoto, Osaka (JP); Shunsuke Mito, Osaka (JP)

(73) Assignee: Tayca Corporation, Osaka (JP)

( * ) Notice: Subject to any disclaimer, the term of this patent is extended or adjusted under 35 U.S.C. 154(b) by 0 days.

(21) Appl. No.: 18/260,838

(22) PCT Filed: Feb. 7, 2022

(86) PCT No.: PCT/JP2022/004606
§ 371 (c)(1),
(2) Date: Jul. 10, 2023

(87) PCT Pub. No.: WO2022/172881
PCT Pub. Date: Aug. 18, 2022

(65) Prior Publication Data
US 2023/0395854 A1 Dec. 7, 2023

(30) Foreign Application Priority Data

Feb. 9, 2021 (JP) .................. 2021-019130

(51) Int. Cl.
| | | |
|---|---|---|
| H01M 10/0567 | (2010.01) | |
| H01G 11/50 | (2013.01) | |
| H01G 11/60 | (2013.01) | |
| H01G 11/62 | (2013.01) | |
| H01G 11/64 | (2013.01) | |
| H01M 4/62 | (2006.01) | |
| H01M 10/0568 | (2010.01) | |
| H01M 10/0569 | (2010.01) | |

(52) U.S. Cl.
CPC ........ *H01M 10/0567* (2013.01); *H01G 11/50* (2013.01); *H01G 11/60* (2013.01); *H01G 11/62* (2013.01); *H01G 11/64* (2013.01); *H01M 4/624* (2013.01); *H01M 10/0568* (2013.01); *H01M 10/0569* (2013.01); *H01M 2300/0037* (2013.01); *H01M 2300/0051* (2013.01)

(58) Field of Classification Search
CPC ................................. C01G 49/0027
See application file for complete search history.

(56) References Cited

U.S. PATENT DOCUMENTS

| 2010/0035150 A1 | 2/2010 | Ando et al. | |
|---|---|---|---|
| 2021/0167396 A1* | 6/2021 | Kazama | ............... H01M 4/505 |

FOREIGN PATENT DOCUMENTS

| CN | 109301242 A | 2/2019 |
|---|---|---|
| CN | 112028126 A | 12/2020 |
| JP | 5220510 B2 | 6/2013 |
| JP | 2016012620 A | 1/2016 |
| JP | 6217990 B2 | 10/2017 |
| JP | 2019-085316 A | 6/2019 |
| JP | 2020167187 A | 10/2020 |
| WO | 2021029357 A1 | 2/2021 |

OTHER PUBLICATIONS

English machine translation of JP201985316A. (Year: 2019).*
International Search Report (PCT/ISA/210) with an English translation, and Written Opinion (PCT/ISA/237) dated Apr. 19, 2022, by the Japan Patent Office as the International Searching Authority for International Application No. PCT/JP2022/004606. (9 pages).
Office Action issued on Dec. 1, 2023, by The State Intellectual Property Office of People's Republic of China in corresponding Chinese Patent Application No. 202228008202.3, with English translation of the Office Action. (19 pages).
Liang et al., "Synthesis and Characterization of Novel Cathode Material Li5FeO4 for Li-ion Batteries", Int. J. of Electrochem. Sci, 2013, vol. 8, pp. 6393-6398.

* cited by examiner

*Primary Examiner* — Peter F Godenschwager
(74) *Attorney, Agent, or Firm* — BUCHANAN, INGERSOLL & ROONEY PC

(57) ABSTRACT

A pre-doping agent for a power storage device includes a lithium iron oxide represented by Formula (1), wherein in X-ray diffractometry, a half width of a diffraction peak at a diffraction angle (2θ) of 23.6°±0.5° is 0.06° to 0.17°, and an intensity ratio (I44.6/I23.6) of a diffraction peak intensity (I44.6) at a diffraction angle (2θ) of 44.6°±0.5° to a diffraction peak intensity (I23.6) at a diffraction angle (2θ) of 23.6°±0.5° is less than 8%. The pre-doping agent for a power storage device with a large irreversible capacity can be suitably used as a power storage device, which can suppress reduction in a volume energy density of a power storage device, can reduce a production cost, can prevent decomposition of an electrolytic solution.

$$Li_xFeO_y \qquad (1)$$

wherein x meets 3.5≤x≤7.0 and y meets 3.1≤y≤5.0.

18 Claims, No Drawings

POWER STORAGE DEVICE PRE-DOPING AGENT AND PRODUCTION METHOD FOR SAME

TECHNICAL FIELD

The present invention relates to a pre-doping agent used for a power storage device such as a lithium ion battery, a lithium ion capacitor and an electric double layer capacitor.

BACKGROUND ART

It is known that in a power storage device such as a lithium ion battery, a lithium ion capacitor and an electric double layer capacitor, a capacitance of the power storage device can be increased by reducing a potential of a negative electrode by pre-doping the negative electrode with lithium ions. There has been recently proposed a method for pre-doping a negative electrode with lithium ions via an electrolytic solution by using a metal foil having a plurality of through holes as a current collector and disposing a metal lithium foil in an electrode comprising a large number of laminated positive electrodes and negative electrodes. Recently, there has been also proposed a method for pre-doping without the use of a metal lithium foil.

Patent Reference No. 1 has described a power storage device comprising an electrode comprising an electrode collector having a plurality of through-holes and an electrode mixture layer disposed in the electrode collector; and an ion source connected to the electrode collector and supplying ions to the electrode mixture layer, wherein the electrode collector has a first region having a given through-hole opening rate and a second region having a larger through-hole opening rate than that of the first region; the first region is an edge of the electrode collector and the second region is a center of the electrode collector. It is also described that the power storage device is incorporated with a lithium electrode, and the lithium electrode has a lithium electrode collector on which a metal lithium foil as an ion source is crimped, and that by injecting an electrolytic solution, a negative electrode is pre-doped with lithium ions from the lithium electrode. According to Patent Reference No. 1, the state of infiltration by the electrolytic solution can be adjusted, allowing for uniform doping the electrode with ions. However, the pre-doping method described in Patent Reference No. 1 has a problem that since the collector uses a metal foil having a plurality of through-holes and a metal lithium foil, a production cost is increased and a volume energy density of a power storage device is reduced.

Patent Reference No. 2 has described a pre-doping agent used for a lithium ion capacitor, which comprises a lithium metal complex oxide represented by the formula: $Li_aMe_bO_c$ wherein $4.5 \leq a \leq 6.5$, $0.5 \leq b \leq 1.5$, $3.5 \leq c \leq 4.5$, Me: one or more selected from the group consisting of Co, Mn, Fe, and Al); a positive electrode for a lithium ion capacitor therewith; and so on. The document describes that the lithium metal complex oxide is decomposed at a high voltage to release lithium, but due to a large irreversible capacity, it releases a large amount of lithium during charging while it little absorbs lithium during discharging, so that the material allows a negative electrode to be doped with a large amount of lithium. Patent Reference No. 2 has also described a pre-doping agent comprising, in addition to the lithium metal complex oxide, a carbon material. Increase in a contact area of the lithium metal complex oxide with the carbon material facilitates effective electron supply to the lithium metal complex oxide through a highly conductive carbon material. Thus, as described in the document, a decomposition reaction of the lithium metal complex oxide actively proceeds, so that a large amount of lithium can be discharged from the lithium metal complex oxide. However, Patent Reference No. 2 has not described that a pre-doping agent for a power storage device with a large irreversible capacity, which can prevent occurrence of a short circuit in the power storage device can be provided by the use of a lithium iron oxide with a particular composition, in which a half width of a diffraction peak in X-ray diffractometry is within a certain range and an intensity ratio of a particular diffraction peak intensity to a particular diffraction peak intensity is less than a certain value. Furthermore, Patent Reference No. 2 describes that a positive electrode potential during initial charging is preferably 4.3 V (based on Li reference electrode) or more, further preferably 4.5 V (based on Li reference electrode) or more, at which a common electrolytic solution is oxidatively decomposed, leading to a problem of accelerated deterioration in performance of a power storage device such as a lithium ion capacitor, and thus improvement has been desired.

Patent Reference No. 3 has described a method for producing a lithium ion secondary battery comprising conducting initial charging of a battery comprising a pre-doping agent prepared by complexing a lithium-manganese oxide having a basic composition of $Li_6MnO_4$ and a carbon material, and a positive electrode comprising a positive-electrode active material, a negative electrode and an electrolyte to make lithium ions released from the positive-electrode active material and the pre-doping agent occluded in the negative electrode active material and to generate a manganese oxide from the pre-doping agent, wherein a positive electrode potential during the above-mentioned initial charging is 4.5 V (based on Li counter electrode) or more. As described in Patent Reference No. 3, by complexing a carbon material with a lithium-manganese oxide, many conducting path to a lithium-manganese oxide are formed, facilitating decomposition of the lithium-manganese oxide during charging. It is described that the pre-doping agent described in Patent Reference No. 3 has a large irreversible capacity. However, a positive electrode potential during initial charging is 4.5 V (based on Li counter electrode) or more, and therefore, a common electrolytic solution is oxidatively decomposed, leading to earlier deterioration in performance of a power storage device such as a lithium ion capacitor, and thus improvement has been desired.

PRIOR ART REFERENCES

Patent References

Patent Reference No. 1: JP 5220510 B
Patent Reference No. 2: JP 2016-12620 A
Patent Reference No. 3: JP 6217990 B

SUMMARY OF THE INVENTION

Problems to be Solved by the Invention

To solve the above problems, an objective of the present invention is to provide a pre-doping agent for a power storage device with a large irreversible capacity suitably used as a power storage device, which can suppress reduction in a volume energy density of a power storage device, can reduce a production cost, can prevent decomposition of an electrolytic solution because it allows for pre-doping with lithium ions at a lower charging voltage, has a high charging depth and a high discharge capacity, and can prevent occurrence of a short circuit.

Means for Solving the Problems

The above problems can be solved by providing a pre-doping agent for a power storage device comprising a lithium iron oxide represented by Formula (1), wherein in X-ray diffractometry, a half width of a diffraction peak at a diffraction angle (2θ) of 23.6°±0.5° is 0.06° to 0.17°, and an intensity ratio (I44.6/I23.6) of a diffraction peak intensity (I44.6) at a diffraction angle (2θ) of 44.6°±0.5° to a diffraction peak intensity (I23.6) at a diffraction angle (2θ) of 23.6°±0.5° is less than 8%:

Li$_x$FeO$_y$ (1)

wherein x meets 3.5≤x≤7.0 and y meets 3.1≤y≤5.0.

The above problems can be also solved by providing a pre-doping agent for a power storage device comprising a lithium iron oxide represented by Formula (1), wherein in X-ray diffractometry, a half width of a diffraction peak at a diffraction angle (2θ) of 23.6±0.5° is 0.06 to 0.17°, and when 5% by weight of Si powder as an internal standard substance is added to the pre-doping agent, an intensity ratio (I44.6/I28.5) of a diffraction peak intensity (I44.6) at a diffraction angle (2θ) of 44.6±0.5° to a diffraction peak intensity (I28.5) at a diffraction angle (2θ) of 28.5±0.5° is less than 20%:

Li$_x$FeO$_y$ (1)

wherein x meets 3.5≤x≤7.0 and y meets 3.1≤y≤5.0.

Here, a preferable embodiment is that after storing a mixture prepared by adding 2.0 g of the pre-doping agent to 18.0 g of an electrolytic solution prepared by dissolving LiPF$_6$ to 1 mol/L in a 1:1 volume-ratio (EC:DEC) mixed solvent of ethylene carbonate(EC) and diethyl carbonate (DEC) in a thermostat bath at 50° C. for one week, an iron-ion elution ratio is 0.01 to 0.10 wt % based on the weight of the pre-doping agent before addition.

Preferably, the pre-doping agent has a specific surface area of 0.05 to 2.2 m$^2$/g, and preferably, the pre-doping agent is coated with at least one coating material selected from the group consisting of an organosilicon compound, a fatty acid, lithium carbonate and a carbonaceous material. A preferable embodiment is a positive electrode for a power storage device, comprising the pre-doping agent and a positive-electrode active material, and a preferable embodiment is a positive electrode, comprising the pre-doping agent in a content of 1 to 60% by weight based on the total weight of the pre-doping agent and the positive-electrode active material. Another preferable embodiment is a power storage device comprising the positive electrode as a constituent.

Furthermore, the above problems can be solved by providing a method for producing a pre-doping agent for a power storage device comprising a lithium iron oxide prepared by mixing and calcining an iron material and a lithium material, comprising mixing the iron material and the lithium material, calcining the mixture in an inert gas atmosphere with an oxygen concentration of 1 to 52000 ppm at 650 to 1050° C. for 2 to 100 hours to give a powdery product, and pulverizing the powdery product to give the lithium iron oxide.

Here, a preferable embodiment is that a further carbon material is mixed with the iron material and the lithium material.

Effects of the Invention

The present invention can provide a pre-doping agent for a power storage device comprising a lithium iron oxide having a particular composition, wherein in X-ray diffractometry, a half width of a diffraction peak at a diffraction angle (2θ) of 23.6°±0.5° is within a particular range, an irreversible capacity is large, and short circuit of the power storage device can be prevented. Thus, pre-doping can be conducted without a metal lithium foil being used, so that reduction in a volume energy density of the power storage device can be prevented and a production cost can be reduced. Furthermore, pre-doping of lithium ions can be conducted at a lower charging voltage and thus decomposition of an electrolytic solution can be prevented, so that a preferable power storage device with a high charging depth and a high discharge capacity which can prevent occurrence of short circuit can be provided.

MODES FOR CARRYING OUT THE INVENTION

A pre-doping agent for a power storage device (hereinafter, sometimes abbreviated as "pre-doping agent") of the present invention comprises a lithium iron oxide represented by Formula (1), wherein in X-ray diffractometry, a half width of a diffraction peak at a diffraction angle (2θ) of 23.6±0.5° is 0.06 to 0.17°, and an intensity ratio (I44.6/I23.6) of a diffraction peak intensity (I44.6) at a diffraction angle (2θ) of 44.6±0.5° to a diffraction peak intensity (I23.6) at a diffraction angle (2θ) of 23.6±0.5° is less than 8%:

Li$_x$FeO$_y$ (1)

wherein x meets 3.5≤x≤7.0 and y meets 3.1≤y≤5.0.

Furthermore, a pre-doping agent of the present invention comprises a lithium iron oxide represented by Formula (1), wherein in X-ray diffractometry, a half width of a diffraction peak at a diffraction angle (2θ) of 23.6±0.5° is 0.06 to 0.17°, and when 5% by weight of Si powder as an internal standard substance is added to the pre-doping agent, an intensity ratio (I44.6/I28.5) of a diffraction peak intensity (I44.6) at a diffraction angle (2θ) of 44.6±0.5° to a diffraction peak intensity (I28.5) at a diffraction angle (2θ) of 28.5±0.5° is less than 20%:

Li$_x$FeO$_y$ (1)

wherein x meets 3.5≤x≤7.0 and y meets 3.1≤y≤5.0.

As a result of intensive studies made, the inventors have found that a pre-doping agent for a power storage device with a large irreversible capacity which can prevent occurrence of short circuit in a power storage device can be provided by the use of a lithium iron oxide having a particular composition, wherein in X-ray diffractometry, a half width of a diffraction peak at a diffraction angle (2θ) of 23.6±0.5° is 0.06 to 0.17°, and an intensity ratio (I44.6/I23.6) of a diffraction peak intensity (I44.6) at a diffraction angle (2θ) of 44.6±0.5° to a diffraction peak intensity (I23.6) at a diffraction angle (2θ) of 23.6±0.5° is less than 8%, and/or wherein when 5% by weight of Si powder as an internal standard substance is added to the pre-doping agent, an intensity ratio (I44.6/I28.5) of a diffraction peak intensity (I44.6) at a diffraction angle (2θ) of 44.6±0.5° to a diffraction peak intensity (I28.5) at a diffraction angle (2θ) of 28.5±0.5° is less than 20%. Thus, pre-doping can be conducted at a lower charging voltage, so that decomposition of an electrolytic solution can be prevented and short circuit in a power storage device can be prevented, resulting in improving safety. In the light of preventing decomposition of an electrolytic solution, a voltage of initial charging conducted as a pre-doping treatment is preferably 4.3 V (based on Li reference electrode) or less, particularly preferably 4.0 V (based on Li reference electrode) or less. Furthermore, a pre-doping agent of the present invention has a large irreversible capacity, so that when it is applied to a positive electrode, the amount of the pre-doping agent can be reduced. Thus, a proportion of a positive-electrode active material can be increased, so that a power storage device with a higher capacity can be provided.

A pre-doping agent of the present invention comprises a lithium iron oxide represented by Formula (1), wherein x meets 3.5≤x≤7.0 and y meets 3.1≤y≤5.0. In a lithium iron oxide represented by Formula (1), a composition ratio x is equivalent to Li/Fe (molar ratio). When x is less than 3.5, the amount of lithium is reduced to be insufficient to dope a negative electrode, probably leading to an insufficient irreversible capacity, and furthermore, it may be difficult to prevent short circuit in a power storage device. Thus, x is preferably 3.7 or more, more preferably 3.8 or more, further preferably 3.9 or more, particularly preferably 4.1 or more. If x is more than 7.0, a crystal lattice may contract and release of lithium becomes difficult, so that charging capacity may be reduced, leading to a pre-doping agent with a low irreversible capacity. Thus, x is preferably 6.8 or less, more preferably 6.5 or less, further preferably 5.5 or less, particularly preferably 5.2 or less. If y is less than 3.1, unreacted lithium and iron material may remain. Thus, y is preferably 3.3 or more, more preferably 3.4 or more, further preferably 3.45 or more. If y is more than 5.0, iron in the lithium iron oxide becomes highly oxidized, so that a charging capacity may be reduced. Thus, y is preferably 4.8 or less, more preferably 4.5 or less, further preferably 4.2 or less, particularly preferably 4.1 or less.

As is evident from comparison between Examples and Comparative Examples described later, it has been found that in Comparative Examples 2, 4 to 8 in which In X-ray diffractometry, a half width of a diffraction peak at a diffraction angle (2θ) of 23.6±0.5° is not within 0.06 to 0.17°, a pre-doping agent with a low irreversible capacity is provided, even when a lithium iron oxide represented by Formula (1) has a particular composition ratio. Furthermore, it has been found that power storage devices produced using pre-doping agents of Comparative Examples 2 and 6, respectively have a lower charging depth and a lower discharge capacity, and power storage devices produced using pre-doping agents of Comparative Examples 4 to 5 and 7 to 8, respectively have a lower discharge capacity. Furthermore, in Comparative Examples 1 and 3 in which the intensity ratio (I44.6/I23.6) does not meet the requirement of less than 8%, and/or the intensity ratio (I44.6/I28.5) does not meet the requirement of less than 20%, short circuit in the power storage device could not be prevented. In contrast, it has been found that in Examples 1 to 33, in which the half width is within 0.06 to 0.17°, the intensity ratio (I44.6/I23.6) is less than 8%, and/or the intensity ratio (I44.6/I28.5) is less than 20%, a pre-doping agent has a large irreversible capacity, and a power storage device produced therewith has a high charging depth and a high discharge capacity, and can prevent occurrence of short circuit. Therefore, it is evidently significant to employ an embodiment wherein in X-ray diffractometry, the half width is 0.06 to 0.17°, an embodiment wherein the intensity ratio (I44.6/I23.6) is less than 8%, and/or an embodiment wherein the intensity ratio (I44.6/I28.5) is less than 20%. A pre-doping agent of the present invention allows for reducing a production cost, pre-doping with lithium ions at a lower charging voltage by which decomposition of an electrolytic solution is prevented, and providing a power storage device which has a high charging depth, a discharge capacity and can prevent occurrence of short circuit.

If in a pre-doping agent of the present invention, the half width is less than 0.06°, a powdery product obtained becomes hard so that pulverization may be difficult. In addition, particles after pulverization are so coarse that they may not be easily applied to an electrode. The half width is preferably 0.07° or more, more preferably 0.09° or more, further preferably 0.10° or more, particularly preferably 0.12° or more. If the half width is more than 0.17°, a polymorphic lithium iron oxide is generated, so that an irreversible capacity may be reduced. The half width is preferably 0.16° or less, more preferably 0.15° or less, further preferably 0.14° or less.

If in a pre-doping agent of the present invention, the intensity ratio (I44.6/I23.6) does not meet the requirement of less than 8%, that is, the intensity ratio (I44.6/I23.6) is 8% or more, it is, as described above, difficult to prevent occurrence of short circuit in a power storage device. The intensity ratio (I44.6/I23.6) is preferably 7% or less, more preferably 6% or less, further preferably 4% or less, particularly preferably 2% or less. The intensity ratio (I44.6/I23.6) is generally 0% or more.

If in a pre-doping agent of the present invention, the intensity ratio (I44.6/I28.5) does not meet the requirement of less than 20%, that is, the intensity ratio (I44.6/I28.5) is 20% or more, it is, as descried above, difficult to prevent occurrence of short circuit in a power storage device. The intensity ratio (I44.6/I28.5) is preferably 19% or less, more preferably 17% or less, further preferably 15% or less, particularly preferably 7% or less. The intensity ratio (I44.6/I28.5) is generally 0% or more.

For a pre-doping agent of the present invention, it is preferable that in X-ray diffractometry, an intensity ratio (I43.5/I23.6) of a diffraction peak intensity (I43.5) at a diffraction angle (2θ) of 43.5±0.3° to a diffraction peak intensity (I23.6) at a diffraction angle (2θ) of 23.6±0.3° is less than 20%. If the intensity ratio (I43.5/I23.6) is 20% or more, a pre-doping agent with a low irreversible capacity may be provided. The intensity ratio (I43.5/I23.6) is more preferably 15% or less, further preferably 10% or less, particularly preferably 8% or less. The intensity ratio (I43.5/I23.6) is generally 0% or more.

In a pre-doping agent of the present invention, it is preferable that a space group of a crystal structure is P b c a, where crystal lattice constants "a" and "c" meet 9.140 Å≤a≤9.205 Å and 9.180 Å≤c≤9.220 Å, respectively and a lattice volume "V" meets 773 Å³≤V≤781 Å³. With the inventors' investigation, they have found that there is correlation between the crystal lattice constants "a" and "c" and Li/Fe (molar ratio). In other words, the inventors assume that as a Li/Fe (molar ratio) value decreases, the crystal lattice constants "a" and "c" increase and thus a lattice volume increases, facilitating lithium release. If the crystal lattice constant "a" is less than 9.140 Å, a lattice volume "V" is reduced, so that lithium release may be difficult. The crystal lattice constant "a" is preferably 9.141 Å or more, more preferably 9.142 Å or more, further preferably 9.143 Å or more. If the crystal lattice constant "a" is more than 9.205 Å, the amount of lithium is reduced to be insufficient to dope a negative electrode, probably leading to an insufficient irreversible capacity. The crystal lattice constant "a" is preferably 9.200 Å or less, more preferably 9.195 Å or less, further preferably 9.185 Å or less. If the crystal lattice constant "c" is less than 9.180 Å, lattice volume V is so reduced that lithium release may be difficult. The crystal lattice constant "c" is preferably 9.181 Å or more, more preferably 9.182 Å or more, further preferably 9.183 Å or more. If the crystal lattice constant "c" is more than 9.220 Å, the amount of lithium is reduced to be insufficient to dope a negative electrode, probably leading to an insufficient irreversible capacity. The crystal lattice constant "c" is preferably 9.215 Å or less, more preferably 9.205 Å or less, further preferably 9.195 Å or less. If the lattice volume V is less than 773 Å$^3$, a lattice volume V is so small that release of lithium may be difficult. The lattice volume V is preferably 773.1 Å$^3$ or more, more preferably 773.2 Å$^3$ or more, further preferably 773.3 Å$^3$ or more. If the lattice volume V is more than 781 Å$^3$, the amount of lithium is reduced to be insufficient to dope a negative electrode, probably leading to an insufficient irreversible capacity. The lattice volume V is preferably 780 Å$^3$ or less, more preferably 778 Å$^3$ or less, further preferably 776 Å$^3$ or less.

In a pre-doping agent of the present invention, a volume resistivity is preferably $9.0 \times 10^4$ to $9.0 \times 10^{15}$ Ω·cm. If the volume resistivity is less than $9.0 \times 10^4$ Ω·cm, electrons preferentially move to a pre-doping agent in a power storage device system, so that only a positive-electrode active material near the pre-doping agent is used and thus the reaction is local, probably leading to reduction in a capacity. If the volume resistivity is more than $9.0 \times 10^{15}$ Ω·cm, electron migration is impeded and thus lithium is insufficiently released, so that irreversible capacity may be reduced. The volume resistivity is preferably $6.0 \times 10^{15}$ Ω·cm or less, more preferably $3.0 \times 10^{15}$ Ω·cm or less, further preferably $9.0 \times 10^{14}$ Ω·cm or less.

In a pre-doping agent of the present invention, a specific surface area is preferably 0.05 to 2.2 m$^2$/g. If the specific surface area is less than 0.05 m$^2$/g, a reaction area is too small for lithium to be sufficiently released from a pre-doping agent, so that a charging capacity and an irreversible capacity may be reduced. The specific surface area is more preferably 0.1 m$^2$/g or more, further preferably 0.2 m$^2$/g or more, particularly preferably 0.5 m$^2$/g or more. If the specific surface area is more than 2.2 m$^2$/g, a side reaction may be induced and it may be difficult to prevent occurrence of short circuit in a power storage device. The specific surface area is more preferably 2.1 m$^2$/g or less, further preferably 1.8 m$^2$/g or less, particularly preferably 1.4 m$^2$/g or less.

In a pre-doping agent of the present invention, an average particle size (D50) is preferably 1 to 60 μm. The average particle size (D50) is more preferably 2 μm or more, further preferably 4 μm or more, particularly preferably 5 μm or more. If the average particle size (D50) is more than 60 μm, it may be difficult to prevent occurrence of short circuit in a power storage device. The average particle size (D50) is more preferably 50 μm or less, further preferably 25 μm or less, particularly preferably 15 μm or less. In the present invention, an average particle size (D50) means a median diameter as determined by measuring particle size distribution using a laser diffraction type particle size distribution meter (Nikkiso Co., Ltd., Microtrac MT-3000).

In a pre-doping agent of the present invention, it is preferable that after storing a mixture prepared by adding 2.0 g of the pre-doping agent to 18.0 g of an electrolytic solution prepared by dissolving LiPF$_6$ to 1 mol/L in a 1:1 volume-ratio (EC:DEC) mixed solvent of ethylene carbonate(EC) and diethyl carbonate (DEC) in a thermostat bath at 50° C. for one week, an iron-ion elution ratio is 0.01 to 0.10 wt % based on the weight of the pre-doping agent before addition. If the iron-ion elution ratio is more than 0.10 wt %, it may be difficult to prevent occurrence of short circuit in a power storage device. The iron-ion elution ratio is more preferably 0.09 wt % or less, further preferably 0.08 wt % or less, particularly preferably 0.06 wt % or less.

There are no particular restrictions to a method for producing a pre-doping agent of the present invention. Preferably employed is a method for producing a pre-doping agent for a power storage device comprising a lithium iron oxide prepared by mixing and calcining an iron material and a lithium material, comprising mixing the iron material and the lithium material (hereinafter, sometimes abbreviated as "mixing process"), calcining the mixture in an inert gas atmosphere with an oxygen concentration of 1 to 52000 ppm at 650 to 1050° C. for 2 to 100 hours to give a powdery product (hereinafter, sometimes abbreviated as "calcination process"), and pulverizing the powdery product to give the lithium iron oxide.

With the inventors' investigation, they have found that a pre-doping agent for a power storage device comprising a lithium iron oxide according to the present invention can be provided by mixing the iron material and the lithium material, and calcining the mixture in an inert gas atmosphere with a particular oxygen concentration at a particular temperature for a particular period. Another preferable embodiment is that a further carbon material is mixed with the iron material and the lithium material. As is evident from comparison between Examples and Comparative Examples described later, it has been found that for a power storage device produced using a pre-doping agent of Comparative Example 3 which was calcined under a nitrogen atmosphere with an oxygen concentration of 0.8 ppm, occurrence of short circuit could not be prevented, while for Comparative Examples 4 and 8 wherein calcination was conducted under a nitrogen atmosphere with an oxygen concentration of 55000 ppm, a pre-doping agent with a low irreversible capacity was provided and thus, for a power storage device produced using each of the pre-doping agents of Comparative Examples 4 and 8, a discharge capacity was low. Therefore, preferably employed is an embodiment that calcination is conducted under an inert gas atmosphere with an oxygen concentration of 1 to 52000 ppm. The oxygen concentration is more preferably 5 ppm or more, further preferably 30 ppm or more, particularly preferably 100 ppm or more, most preferably 300 ppm or more. Meanwhile, the oxygen concentration is more preferably 50000 ppm or less, further preferably 35000 ppm or less, particularly preferably 28000 ppm or less, most preferably 10000 ppm or less.

Examples of an iron material which is preferably used in the present invention include, but not limited to, iron (III) oxide-hydroxide, iron (II) oxide, iron (III) oxide, ferrous (II) sulfate, ferric (III) sulfate, iron (II) hydroxide, and iron (III) hydroxide.

Examples of a lithium material which is preferably used in the present invention include, but not limited to, lithium hydroxide, lithium carbonate, lithium acetate, lithium nitrate, and lithium oxide. These can be hydrate or anhydrous. Among these, lithium hydroxide is more preferably used.

A further carbon material can be mixed with the iron material and the lithium material. Carbon materials which can be preferably used include, but not limited to, activated charcoal, acetylene black, polyvinyl alcohol, carbon nanotube, carbon nanofiber, graphene, hard carbon and soft carbon, and there are no particular restrictions to a raw material, method for processing/activation and physical properties for the carbon material. The amount of the carbon material is preferably 1 to 50% by weight based on the total weight of the iron material, the lithium material and the carbon material. If the amount of the carbon material is less than 1% by weight, a reaction of lithium with iron is heterogeneous, so that polymorphic lithium iron oxide may be generated, leading to reduction in an irreversible capacity. Furthermore, it may be difficult to pulverize a powdery product obtained. The amount of the carbon material is preferably 5% by weight or more. The amount of the carbon material of more than 50% by weight is not preferable because a production cost may be disadvantageously increased. The amount of the carbon material is more preferably 30% by weight or less.

In the mixing process, the iron material and the lithium material are mixed. When a further carbon material is contained, the iron material, the lithium material and the carbon material are mixed. Mixing can be dry-mixing or wet-mixing, and dry-mixing is preferable. Among others, a preferable embodiment is mixing the iron material and the lithium material as powder, and when a further carbon material is contained, a preferable embodiment is mixing the iron material, the lithium material and the carbon material as powder.

As described above, a preferable embodiment of the calcination process is calcination under an inert gas atmosphere with an oxygen concentration of 1 to 52000 ppm. Examples of an inert gas which can be preferably used, include nitrogen, argon, helium, neon and krypton. A calcination temperature in the calcination process is preferably 650 to 1050° C. If the calcination temperature is lower than 650° C., unreacted materials remain, so that a lithium iron oxide represented by Formula (1) may not be obtained, and there may be provided a lithium iron oxide which does not meet the requirement that a half width of a diffraction peak at a diffraction angle (2θ) of 23.6±0.5° is within the range of 0.06 to 0.17°. The calcination temperature is more preferably 680° C. or higher, further preferably 725° C. or higher, particularly preferably 775° C. or higher. If the calcination temperature is higher than 1050° C., a powdery product obtained may be so hard that pulverization may be difficult, particles after pulverization are so coarse that they may not be easily applied to an electrode, and there may be provided a lithium iron oxide which does not meet the requirement that a half width of a diffraction peak at a diffraction angle (2θ) of 23.6±0.5° is within the range of 0.06 to 0.17°. The calcination temperature is more preferably 950° C. or lower, further preferably 900° C. or lower, particularly preferably 880° C. or lower.

A calcination time of the calcination process is preferably 2 to 100 hours. If the calcination time is less than 2 hours, unreacted materials remain, so that a lithium iron oxide represented by Formula (1) may not be provided, and there may be provided a lithium iron oxide which does not meet the requirement that a half width of a diffraction peak at a diffraction angle (2θ) of 23.6±0.5° is within the range of 0.06 to 0.17°. The calcination time is preferably 2 hours or more, more preferably 5 hours or more, further preferably 8 hours or more, particularly preferably 10 hours or more. If the calcination time is more than 100 hours, productivity may be deteriorated. The calcination time is more preferably 90 hours or less.

A preferable embodiment is that a powdery product obtained in the calcination process is pulverized. Pulverization is conducted preferably using at least one pulverizing apparatus selected from the group consisting of a ball mill, a satellite mill, a bud crusher, a jet mill and a pin mill, more preferably at least one pulverizing apparatus selected from the group consisting of a ball mill and a satellite mill. In particular, in the light of preventing occurrence of short circuit in a power storage device, a preferable embodiment is that a pre-doping agent is pulverized such that an average particle size (D50) of the pre-doping agent is within a certain range. An average particle size (D50) of the pre-doping agent is preferably within the above-mentioned range. Another embodiment is that magnetic materials are removed by magnetic-sorting the pre-doping agent after pulverization.

In the light of endowing moisture resistance, a preferable embodiment is that the pre-doping agent is coated with at least one coating material selected from the group consisting of an organosilicon compound, a fatty acid, a lithium carbonate and a carbonaceous material. That is, a preferable embodiment is at least one pre-doping agent for a power storage device selected from the group consisting of silica coated lithium iron oxide, fatty-acid coated lithium iron oxide, lithium-carbonate coated lithium iron oxide and carbonaceous-material coated lithium iron oxide. It is preferable that the whole surface of the pre-doping agent is coated, but there can be an uncoated surface of the pre-doping agent. In the present invention, coating the pre-doping agent means that when the elements of C, O, Si and Fe are designated in measurement by an X-ray photoelectron analyzer, an element concentration of C or Si from the uppermost surface of the pre-doping agent to a depth of 1 nm is a certain value or more. The element concentration is preferably 12% or more, more preferably 15% or more, further preferably 20% or more, particularly preferably 25% or more. The element concentration is generally 45% or less.

There are no particular restrictions to the organosilicon compound as long as the surface of a pre-doping agent is coated with silica; preferable examples include tetramethoxysilane, tetraethoxysilane, tetrabutoxysilane, methyltrimethoxysilane, ethyltrimethoxysilane, triethoxycaprylylsilane and vinyltriethoxysilane. Preferable examples of the fatty acid include higher fatty acids having 10 to 24 carbon atoms such as lauric acid, myristic acid, palmitic acid, stearic acid, isostearic acid, oleic acid and behenic acid. Preferable examples of the carbonaceous material include activated charcoal, acetylene black, polyvinyl alcohol, carbon nanotube, carbon nanofiber, graphene, hard carbon, soft carbon and Ketjenblack.

There are no particular restrictions to a method for coating the pre-doping agent, and the coating material and the pre-doping agent can be mixed and the mixture can be, if necessary, calcined to coat the pre-doping agent. A calcination temperature is preferably 300 to 600° C., and a calcination time is preferably 0.5 to 24 hours. A preferable method for coating the pre-doping agent using a fatty acid is a coating method comprising wet-mixing a fatty acid and the pre-doping agent and conducting coating by distillation under reduced pressure or the like instead of calcination. A preferable method for coating the pre-doping agent using lithium carbonate is a method comprising calcining the pre-doping agent under a carbon dioxide atmosphere with a oxygen concentration of 1 to 52000 ppm at 300 to 600° C., or a method comprising bubbling carbon dioxide gas to the pre-doping agent in an organic solvent. In a preferable embodiment, the pre-doping agent thus coated is pulverized as appropriate suitably by a pulverizing method for the above powdery product.

By using a lithium iron oxide thus obtained as a pre-doping agent for a power storage device of the present invention, pre-doping can be conducted without a metal lithium foil being used. Therefore, reduction in a volume energy density of the power storage device can be prevented and a production cost can be reduced, and there can be provided a power storage device with a high charging depth and a high discharge capacity, which can prevent occurrence of short circuit. Among others, a positive electrode for a power storage device comprising a pre-doping agent of the present invention and a positive-electrode active material is a preferably embodiment. A positive-electrode active material can be a material used for a lithium ion battery or a lithium ion capacitor; preferable examples include a lamellar rock salt type lithium oxide containing a transition metal element selected from the group consisting of Ni, Co, Mn and Al; a spinel type lithium oxide containing a transition metal element selected from the group consisting of Ni, Co, Mn, Ti, Fe, Cr, Zn and Cu; an olivine type lithium phosphate compound represented by $LiFePO_4$; and a carbon material such as activated charcoal, acetylene black, Ketjenblack and a graphene sheet. Examples of the lamellar rock salt type lithium oxide include $LiNiO_2$, $LiCoO_2$, $Li_2MnO_3$, $Li(Ni_{1/3}Co_{1/3}Mn_{1/3})O_2$, $Li(Ni_{0.5}Co_{0.2}Mn_{0.3})O_2$, $Li(Ni_{0.6}Co_{0.2}Mn_{0.2})O_2$, $Li(Ni_{0.8}Co_{0.1}Mn_{0.1})O_2$ and $Li(Ni_{0.8}Co_{0.15}Al_{0.05})O_2$, and examples of the spinel type lithium oxide include $LiMn_2O_4$ and $LiMn_{1.5}Ni_{0.5}O_4$.

In the positive electrode, the amount of the pre-doping agent is preferably 1 to 60% by weight based on the total weight of the pre-doping agent and the positive-electrode active material. If a content of the pre-doping agent is less than 1% by weight, an irreversible capacity is too low to reduce a potential of a negative electrode such as graphite and silicon, and a content of the pre-doping agent is more preferably 2% by weight or more, further preferably 5% by weight or more. If a content of the pre-doping agent is more than 60% by weight, an energy density may be reduced as a content of the positive-electrode active material is reduced, and a content of the pre-doping agent is more preferably 55% by weight or less, further preferably 45% by weight or less.

In the present invention, a more preferable embodiment is a power storage device comprising the positive electrode as a constituent. Preferable examples of a negative electrode in the power storage device include carbon materials such as graphite and activated carbon; silicon materials such as silicon and silicon monoxide; metal materials such as tin, aluminum and germanium; and sulfur. Preferable examples of an electrolyte in a power storage device include an electrolytic solution of a lithium salt such as $LiPF_6$, $LiBF_4$ and $LiClO_4$ in an organic solvent (liquid electrolyte), and a solid electrolyte. There are no particular restrictions to the type of the power storage device, and preferred is at least one power storage device selected from the group consisting of a lithium ion battery, an all-solid-state battery, a lithium ion capacitor and an electric double layer capacitor. Among these, more preferred are at least one power storage device selected from the group consisting of a lithium ion battery and a lithium ion capacitor. Among lithium ion capacitors, a more preferable embodiment is a graphite lithium ion capacitor which uses graphite as a negative electrode.

When a pre-doping agent of the present invention is between a positive electrode and a negative electrode, it can be effective as a pre-doping agent. For example, it can be applied to the surface of a positive electrode, applied to the surface of a separator, contained in a separator, or the like. When it is applied to the surface of a separator to form a pre-doping agent layer, a slurry prepared by mixing a pre-doping agent, a solvent, a binder and the like is coated on a separator using a coater and then the solvent is removed to form the layer. The pre-doping agent layer can be formed on either surface of the separator, more preferably near the positive-electrode active material layer. Specifically, it is preferable that, when the positive electrode and the negative electrode are disposed via a separator, the pre-doping agent layer is formed on a surface of the separator facing the positive electrode. The pre-doping agent layer can be formed not only on one surface of a separator but also on both surfaces.

EXAMPLES

The present invention will be more specifically described with reference to Examples.
[Production of a Pre-Doping Agent (LFO)]

Example 1

Using a blender, 100 g of iron (III) oxide-hydroxide (from FUJIFILM Wako Pure Chemical Corporation), 178 g of lithium hydroxide monohydrate (from FUJIFILM Wako Pure Chemical Corporation) and 31 g of activated carbon ("Kuraray Coal", from Kuraray Co., Ltd.) were dry-blended. The mixture obtained was calcined in a nitrogen atmosphere with an oxygen concentration of 500 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=3.77 (molar ratio)) which is a pre-doping agent of Example 1.

Example 2

Using a blender, 100 g of iron (III) oxide-hydroxide (from FUJIFILM Wako Pure Chemical Corporation), 184 g of lithium hydroxide monohydrate (from FUJIFILM Wako Pure Chemical Corporation) and 32 g of activated carbon ("Kuraray Coal", from Kuraray Co., Ltd.) were dry-blended. The mixture obtained was calcined in a nitrogen atmosphere with an oxygen concentration of 500 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=3.89 (molar ratio)) which is a pre-doping agent of Example 2.

Example 3

Using a blender, 100 g of iron (III) oxide-hydroxide (from FUJIFILM Wako Pure Chemical Corporation), 199 g of lithium hydroxide monohydrate (from FUJIFILM Wako Pure Chemical Corporation) and 33 g of activated carbon ("Kuraray Coal", from Kuraray Co., Ltd.) were dry-blended. The mixture obtained was calcined in a nitrogen atmosphere with an oxygen concentration of 500 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.21 (molar ratio)) which is a pre-doping agent of Example 3.

Example 4

Using a blender, 100 g of iron (III) oxide-hydroxide (from FUJIFILM Wako Pure Chemical Corporation), 210 g of lithium hydroxide monohydrate (from FUJIFILM Wako Pure Chemical Corporation) and 34 g of activated carbon ("Kuraray Coal", from Kuraray Co., Ltd.) were dry-blended. The mixture obtained was calcined in a nitrogen atmosphere with an oxygen concentration of 500 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.45 (molar ratio)) which is a pre-doping agent of Example 4.

Example 5

Using a blender, 100 g of iron (III) oxide-hydroxide (from FUJIFILM Wako Pure Chemical Corporation), 222 g of lithium hydroxide monohydrate (from FUJIFILM Wako Pure Chemical Corporation) and 36 g of activated carbon ("Kuraray Coal", from Kuraray Co., Ltd.) were dry-blended. The mixture obtained was calcined in a nitrogen atmosphere with an oxygen concentration of 500 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.69 (molar ratio)) which is a pre-doping agent of Example 5.

Example 6

Using a blender, 100 g of iron (III) oxide-hydroxide (from FUJIFILM Wako Pure Chemical Corporation), 246 g of lithium hydroxide monohydrate (from FUJIFILM Wako Pure Chemical Corporation) and 38 g of activated carbon ("Kuraray Coal", from Kuraray Co., Ltd.) were dry-blended. The mixture obtained was calcined in a nitrogen atmosphere with an oxygen concentration of 500 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=5.21 (molar ratio)) which is a pre-doping agent of Example 6.

Example 7

Using a blender, 100 g of iron (III) oxide-hydroxide (from FUJIFILM Wako Pure Chemical Corporation), 308 g of lithium hydroxide monohydrate (from FUJIFILM Wako Pure Chemical Corporation) and 45 g of activated carbon ("Kuraray Coal", from Kuraray Co., Ltd.) were dry-blended. The mixture obtained was calcined in a nitrogen atmosphere with an oxygen concentration of 500 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=6.51 (molar ratio)) which is a pre-doping agent of Example 7.

Example 8

Using a blender, 100 g of iron (III) oxide-hydroxide (from FUJIFILM Wako Pure Chemical Corporation), 222 g of lithium hydroxide monohydrate (from FUJIFILM Wako Pure Chemical Corporation) and 36 g of activated carbon ("Kuraray Coal", from Kuraray Co., Ltd.) were dry-blended. The mixture obtained was calcined in a nitrogen atmosphere with an oxygen concentration of 500 ppm at 900° C. for 10 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.69 (molar ratio)) which is a pre-doping agent of Example 8.

Example 9

Using a blender, 100 g of iron (III) oxide-hydroxide (from FUJIFILM Wako Pure Chemical Corporation), 222 g of lithium hydroxide monohydrate (from FUJIFILM Wako Pure Chemical Corporation) and 36 g of activated carbon ("Kuraray Coal", from Kuraray Co., Ltd.) were dry-blended. The mixture obtained was calcined in a nitrogen atmosphere with an oxygen concentration of 500 ppm at 950° C. for 5 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.69 (molar ratio)) which is a pre-doping agent of Example 9.

Example 10

Using a blender, 100 g of iron (III) oxide-hydroxide (from FUJIFILM Wako Pure Chemical Corporation), 222 g of lithium hydroxide monohydrate (from FUJIFILM Wako Pure Chemical Corporation) and 36 g of activated carbon ("Kuraray Coal", from Kuraray Co., Ltd.) were dry-blended. The mixture obtained was calcined in a nitrogen atmosphere with an oxygen concentration of 500 ppm at 1000° C. for 5 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.69 (molar ratio)) which is a pre-doping agent of Example 10.

Example 11

Using a blender, 100 g of iron (III) oxide-hydroxide (from FUJIFILM Wako Pure Chemical Corporation), 222 g of lithium hydroxide monohydrate (from FUJIFILM Wako Pure Chemical Corporation) and 36 g of activated carbon ("Kuraray Coal", from Kuraray Co., Ltd.) were dry-blended. The mixture obtained was calcined in a nitrogen atmosphere with an oxygen concentration of 500 ppm at 800° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.69 (molar ratio)) which is a pre-doping agent of Example 11.

Example 12

Using a blender, 100 g of iron (III) oxide-hydroxide (from FUJIFILM Wako Pure Chemical Corporation), 222 g of lithium hydroxide monohydrate (from FUJIFILM Wako Pure Chemical Corporation) and 36 g of activated carbon ("Kuraray Coal", from Kuraray Co., Ltd.) were dry-blended. The mixture obtained was calcined in a nitrogen atmosphere with an oxygen concentration of 500 ppm at 750° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.69 (molar ratio)) which is a pre-doping agent of Example 12.

Example 13

Using a blender, 100 g of iron (III) oxide-hydroxide (from FUJIFILM Wako Pure Chemical Corporation), 222 g of lithium hydroxide monohydrate (from FUJIFILM Wako Pure Chemical Corporation) and 36 g of activated carbon ("Kuraray Coal", from Kuraray Co., Ltd.) were dry-blended. The mixture obtained was calcined in a nitrogen atmosphere with an oxygen concentration of 500 ppm at 700° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.69 (molar ratio)) which is a pre-doping agent of Example 13.

Example 14

Using a blender, 100 g of iron (III) oxide-hydroxide (from FUJIFILM Wako Pure Chemical Corporation), 222 g of lithium hydroxide monohydrate (from FUJIFILM Wako Pure Chemical Corporation) and 36 g of activated carbon ("Kuraray Coal", from Kuraray Co., Ltd.) were dry-blended. The mixture obtained was calcined in a nitrogen atmosphere with an oxygen concentration of 0.5% at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.69 (molar ratio)) which is a pre-doping agent of Example 14.

Example 15

Using a blender, 100 g of iron (III) oxide-hydroxide (from FUJIFILM Wako Pure Chemical Corporation), 222 g of lithium hydroxide monohydrate (from FUJIFILM Wako Pure Chemical Corporation) and 36 g of activated carbon ("Kuraray Coal", from Kuraray Co., Ltd.) were dry-blended. The mixture obtained was calcined in a nitrogen atmosphere with an oxygen concentration of 3% at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.69 (molar ratio)) which is a pre-doping agent of Example 15.

Example 16

Using a blender, 100 g of iron (III) oxide-hydroxide (from FUJIFILM Wako Pure Chemical Corporation), 222 g of lithium hydroxide monohydrate (from FUJIFILM Wako Pure Chemical Corporation) and 36 g of activated carbon ("Kuraray Coal", from Kuraray Co., Ltd.) were dry-blended. The mixture obtained was calcined in a nitrogen atmosphere with an oxygen concentration of 5 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.69 (molar ratio)) which is a pre-doping agent of Example 16.

Example 17

Using a blender, 100 g of iron (III) oxide-hydroxide (from FUJIFILM Wako Pure Chemical Corporation), 222 g of lithium hydroxide monohydrate (from FUJIFILM Wako Pure Chemical Corporation) and 36 g of activated carbon ("Kuraray Coal", from Kuraray Co., Ltd.) were dry-blended. The mixture obtained was calcined in a nitrogen atmosphere with an oxygen concentration of 50 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.69 (molar ratio)) which is a pre-doping agent of Example 17.

Example 18

Using a blender, 100 g of iron (III) oxide-hydroxide (from FUJIFILM Wako Pure Chemical Corporation), 222 g of lithium hydroxide monohydrate (from FUJIFILM Wako Pure Chemical Corporation) and 36 g of activated carbon ("Kuraray Coal", from Kuraray Co., Ltd.) were dry-blended. The mixture obtained was calcined in a nitrogen atmosphere with an oxygen concentration of 500 ppm at 850° C. for 72 hours in a calcination furnace, to give a powdery product. Then, the powdery product obtained was pulverized using a pulverizer ("ZM-200", from Retsch GmbH) with a mesh of 0.25 mm at a revolution number of 15000 rpm, to give lithium iron oxide (Li/Fe=4.69 (molar ratio)) which is a pre-doping agent of Example 18.

Example 19

Using a blender, 100 g of iron (III) oxide-hydroxide (from FUJIFILM Wako Pure Chemical Corporation), 222 g of lithium hydroxide monohydrate (from FUJIFILM Wako Pure Chemical Corporation) and 36 g of activated carbon ("Kuraray Coal", from Kuraray Co., Ltd.) were dry-blended. The mixture obtained was calcined in a nitrogen atmosphere with an oxygen concentration of 500 ppm at 850° C. for 72 hours in a calcination furnace, to give a powdery product. Then, the powdery product obtained was pulverized using a pulverizer ("ZM-200", from Retsch GmbH) with a mesh of 0.50 mm at a revolution number of 10000 rpm, to give lithium iron oxide (Li/Fe=4.69 (molar ratio)) which is a pre-doping agent of Example 19.

Example 20

Using a blender, 100 g of iron (III) oxide-hydroxide (from FUJIFILM Wako Pure Chemical Corporation), 222 g of lithium hydroxide monohydrate (from FUJIFILM Wako Pure Chemical Corporation) and 36 g of a carbon material ("Kuraray Coal", from Kuraray Co., Ltd.) were dry-blended. The mixture obtained was calcined in a nitrogen atmosphere with an oxygen concentration of 1 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, and then magnetic-sorted for removing magnetic material, to give lithium iron oxide (Li/Fe=4.69 (molar ratio)) which is a pre-doping agent of Example 20.

Example 21

Using a blender, 100 g of iron (III) oxide-hydroxide (from FUJIFILM Wako Pure Chemical Corporation) and 178 g of lithium hydroxide monohydrate (from FUJIFILM Wako Pure Chemical Corporation) were dry-blended. The mixture obtained was calcined in a nitrogen atmosphere with an oxygen concentration of 500 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=3.77 (molar ratio)) which is a pre-doping agent of Example 21.

Example 22

Using a blender, 100 g of iron (III) oxide-hydroxide (from FUJIFILM Wako Pure Chemical Corporation) and 199 g of lithium hydroxide monohydrate (from FUJIFILM Wako Pure Chemical Corporation) were dry-blended. The mixture obtained was calcined in a nitrogen atmosphere with an oxygen concentration of 500 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.21 (molar ratio)) which is a pre-doping agent of Example 22.

Example 23

Using a blender, 100 g of iron (III) oxide-hydroxide (from FUJIFILM Wako Pure Chemical Corporation) and 222 g of lithium hydroxide monohydrate (from FUJIFILM Wako Pure Chemical Corporation) were dry-blended. The mixture obtained was calcined in a nitrogen atmosphere with an oxygen concentration of 500 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.69 (molar ratio)) which is a pre-doping agent of Example 23. Element concentrations of C, O, Si and Fe from the uppermost surface to a depth of 1 nm were measured by an X-ray photoelectron analyzer, and the determined concentrations were 10% for C and 0% for Si.

Example 24

Using a blender, 100 g of iron (III) oxide-hydroxide (from FUJIFILM Wako Pure Chemical Corporation) and 237 g of lithium hydroxide monohydrate (from FUJIFILM Wako Pure Chemical Corporation) were dry-blended. The mixture obtained was calcined in a nitrogen atmosphere with an oxygen concentration of 500 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=5.00 (molar ratio)) which is a pre-doping agent of Example 24.

Example 25

Using a blender, 100 g of iron (III) oxide-hydroxide (from FUJIFILM Wako Pure Chemical Corporation) and 246 g of lithium hydroxide monohydrate (from FUJIFILM Wako Pure Chemical Corporation) were dry-blended. The mixture obtained was calcined in a nitrogen atmosphere with an oxygen concentration of 500 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=5.21 (molar ratio)) which is a pre-doping agent of Example 25.

Example 26

Using a blender, 100 g of iron (III) oxide-hydroxide (from FUJIFILM Wako Pure Chemical Corporation) and 308 g of lithium hydroxide monohydrate (from FUJIFILM Wako Pure Chemical Corporation) were dry-blended. The mixture obtained was calcined in a nitrogen atmosphere with an oxygen concentration of 500 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=6.51 (molar ratio)) which is a pre-doping agent of Example 26.

Example 27

Using a blender, 100 g of iron (III) oxide-hydroxide (from FUJIFILM Wako Pure Chemical Corporation) and 222 g of lithium hydroxide monohydrate (from FUJIFILM Wako Pure Chemical Corporation) were dry-blended. The mixture obtained was calcined in a nitrogen atmosphere with an oxygen concentration of 500 ppm at 1000° C. for 5 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.69 (molar ratio)) which is a pre-doping agent of Example 27.

Example 28

Using a blender, 100 g of iron (III) oxide-hydroxide (from FUJIFILM Wako Pure Chemical Corporation) and 222 g of lithium hydroxide monohydrate (from FUJIFILM Wako Pure Chemical Corporation) were dry-blended. The mixture obtained was calcined in a nitrogen atmosphere with an oxygen concentration of 500 ppm at 650° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.69 (molar ratio)) which is a pre-doping agent of Example 28.

Example 29

Using a blender, 100 g of iron (III) oxide-hydroxide (from FUJIFILM Wako Pure Chemical Corporation) and 222 g of lithium hydroxide monohydrate (from FUJIFILM Wako Pure Chemical Corporation) were dry-blended. The mixture obtained was calcined in a nitrogen atmosphere with an oxygen concentration of 3% at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.69 (molar ratio)) which is a pre-doping agent of Example 29.

Example 30

Using a blender, 100 g of iron (III) oxide-hydroxide (from FUJIFILM Wako Pure Chemical Corporation) and 222 g of lithium hydroxide monohydrate (from FUJIFILM Wako Pure Chemical Corporation) were dry-blended. The mixture obtained was calcined in a nitrogen atmosphere with an oxygen concentration of 5 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.69 (molar ratio)) which is a pre-doping agent of Example 30.

Example 31

Using a blender, 100 g of lithium iron oxide (Li/Fe=4.69 (molar ratio)) as a pre-doping agent of Example 23 and 10 g of tetraethoxysilane ("KBE-04", from Shin-Etsu Chemical Co., Ltd.) were dry-blended. The mixture obtained was calcined in a nitrogen atmosphere with an oxygen concentration of 500 ppm at 550° C. for 5 hours in a calcination furnace, to give a powdery product. Then, the powdery product obtained was pulverized using a pulverizer ("P-6", from FRITSCH GmbH) at a revolution number of 200 rpm for 45 min, to give a silica-coated lithium iron oxide which is a pre-doping agent of Example 31. Element concentrations of C, O, Si and Fe from the uppermost surface to a depth of 1 nm were measured by an X-ray photoelectron analyzer, and the determined concentration was 27% for Si.

Example 32

In 900 g of toluene, 100 g of lithium iron oxide (Li/Fe=4.69 (molar ratio)) which is a pre-doping agent of Example 23 and 5 g of stearic acid ("Purified stearic acid 450V", from Kao Corporation) were wet-blended, and vacuum-distilled at 70° C. The powdery product obtained was pulverized using a pulverizer ("P-6", from FRITSCH GmbH) at a revolution number of 200 rpm for 45 min, to give a stearic acid-coated lithium iron oxide which is a pre-doping agent of Example 32. Element concentrations of C, O, Si and Fe from the uppermost surface to a depth of 1 nm were measured by an X-ray photoelectron analyzer, and the determined concentration was 30% for C.

Example 33

Using a calcination furnace, 100 g of lithium iron oxide (Li/Fe=4.69 (molar ratio)) which is a pre-doping agent of Example 23 was calcined in a carbon dioxide atmosphere with an oxygen concentration of 500 ppm at 550° C. for 5 hours, to give a powdery product. Then, the powdery product obtained was pulverized using a pulverizer ("P-6", from FRITSCH GmbH) at a revolution number of 200 rpm for 45 min, to give a lithium carbonate-coated lithium iron oxide which is a pre-doping agent of Example 33. Element concentrations of C, O, Si and Fe from the uppermost surface to a depth of 1 nm were measured by an X-ray photoelectron analyzer, and the determined concentration was 35% for C.

Comparative Example 1

Using a blender, 100 g of iron (III) oxide-hydroxide (from FUJIFILM Wako Pure Chemical Corporation), 161 g of lithium hydroxide monohydrate (from FUJIFILM Wako Pure Chemical Corporation) and 29 g of activated carbon ("Kuraray Coal", from Kuraray Co., Ltd.) were dry-blended. The mixture obtained was calcined in a nitrogen atmosphere with an oxygen concentration of 500 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=3.41 (molar ratio)) which is a pre-doping agent of Comparative Example 1.

Comparative Example 2

Using a blender, 100 g of iron (III) oxide-hydroxide (from FUJIFILM Wako Pure Chemical Corporation), 334 g of lithium hydroxide monohydrate (from FUJIFILM Wako Pure Chemical Corporation) and 48 g of activated carbon ("Kuraray Coal", from Kuraray Co., Ltd.) were dry-blended. The mixture obtained was calcined in a nitrogen atmosphere with an oxygen concentration of 500 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=7.08 (molar ratio)) which is a pre-doping agent of Comparative Example 2.

Comparative Example 3

Using a blender, 100 g of iron (III) oxide-hydroxide (from FUJIFILM Wako Pure Chemical Corporation), 222 g of lithium hydroxide monohydrate (from FUJIFILM Wako Pure Chemical Corporation) and 36 g of activated carbon ("Kuraray Coal", from Kuraray Co., Ltd.) were dry-blended. The mixture obtained was calcined in a nitrogen atmosphere with an oxygen concentration of 0.8 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.69 (molar ratio)) which is a pre-doping agent of Comparative Example 3.

Comparative Example 4

Using a blender, 100 g of iron (III) oxide-hydroxide (from FUJIFILM Wako Pure Chemical Corporation), 222 g of lithium hydroxide monohydrate (from FUJIFILM Wako Pure Chemical Corporation) and 36 g of activated carbon ("Kuraray Coal", from Kuraray Co., Ltd.) were dry-blended. The mixture obtained was calcined in a nitrogen atmosphere with an oxygen concentration of 5.5% at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.69 (molar ratio)) which is a pre-doping agent of Comparative Example 4.

Comparative Example 5

Using a blender, 100 g of iron (III) oxide-hydroxide (from FUJIFILM Wako Pure Chemical Corporation) and 161 g of lithium hydroxide monohydrate (from FUJIFILM Wako Pure Chemical Corporation) were dry-blended. The mixture obtained was calcined in a nitrogen atmosphere with an oxygen concentration of 500 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=3.41 (molar ratio)) which is a pre-doping agent of Comparative Example 5.

Comparative Example 6

Using a blender, 100 g of iron (III) oxide-hydroxide (from FUJIFILM Wako Pure Chemical Corporation) and 334 g of lithium hydroxide monohydrate (from FUJIFILM Wako Pure Chemical Corporation) were dry-blended. The mixture obtained was calcined in a nitrogen atmosphere with an oxygen concentration of 500 ppm at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=7.08 (molar ratio)) which is a pre-doping agent of Comparative Example 6.

Comparative Example 7

Using a blender, 100 g of iron (III) oxide-hydroxide (from FUJIFILM Wako Pure Chemical Corporation) and 237 g of lithium hydroxide monohydrate (from FUJIFILM Wako Pure Chemical Corporation) were dry-blended. The mixture obtained was calcined in a nitrogen atmosphere with an oxygen concentration of 500 ppm at 600° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=5.00 (molar ratio)) which is a pre-doping agent of Comparative Example 7.

Comparative Example 8

Using a blender, 100 g of iron (III) oxide-hydroxide (from FUJIFILM Wako Pure Chemical Corporation) and 222 g of lithium hydroxide monohydrate (from FUJIFILM Wako Pure Chemical Corporation) were dry-blended. The mixture obtained was calcined in a nitrogen atmosphere with an oxygen concentration of 5.5% at 850° C. for 72 hours in a calcination furnace, to give a powdery product. Then, the powdery product obtained was pulverized using a pulverizer ("P-6", from FRITSCH GmbH) at a revolution number of 200 rpm for 45 min, to give lithium iron oxide (Li/Fe=4.69 (molar ratio)) which is a pre-doping agent of Comparative Example 8.

[Evaluation of a Pre-Doping Agent]

In evaluation of a pre-doping agent below, measurement was conducted, unless otherwise stated, under a nitrogen or argon atmosphere.

(Composition Analysis)

By ICP optical emission spectroscopy using a plasma-atomic emission spectrometer "SPECTRO ARCOS" from Hitachi High-Tech Science Corporation, a molar ratio of Li/Fe was measured for each of pre-doping agents obtained in Examples and Comparative Examples. The results are shown in Table 1.

(Calculation of a Crystal Lattice Constant, a Lattice Volume, a Half Width and a Peak Intensity Ratio)

Using an XRD apparatus "X'pert-PRO" from Philips Inc., a peak position and a half width for each of pre-doping agents obtained in Example and Comparative Example were measured with Cu Kα-ray. Here, measurement was conducted with Si powder (from Katayama Chemical Industries Co., Ltd.) as an internal standard substance being blended to 5 wt % based on each pre-doping agent. Using an analysis software (HighScore Plus), a crystal lattice constant and a lattice volume were refined. In the analysis, a peak position was corrected with reference to an Si (111) peak, and then Rietveld analysis (<Phase fit>Default Rietveld) was conducted using $Li_5FeO_4$ (ICSD:01-075-1253) as an approximate structure model, to calculate a crystal lattice constant and a lattice volume V. For a peak intensity ratio, were determined an intensity ratio (I44.6/I23.6) of a diffraction peak intensity (I44.6) with 2θ (diffraction angle)=44.6±0.5° to a diffraction peak intensity (I23.6) with 2θ (diffraction angle)=23.6±0.5°, and an intensity ratio (I44.6/I28.5) of a diffraction peak intensity (I44.6) with 2θ (diffraction angle) =44.6±0.5° to a diffraction peak intensity (I28.5) with 2θ (diffraction angle)=28.5±0.5°. The results are shown in Table 1.

(Method for Determining a Volume Resistivity)

For each of pre-doping agents obtained in Examples and Comparative Examples, a volume resistivity was measured using a high resistivity meter (Hiresta-UX, from Mitsubishi Chemical Analytic Co.). The measured value was calculated with reference to a resistance value at 5 kN. The results are shown in Table 2.

(Method for Determining a Specific Surface Area)

For each of pre-doping agents obtained in Examples and Comparative Examples, a specific surface area was measured by BET method using a full automatic specific surface area analyzer (Macsorb HM model-1208, from Mountech Co., Ltd.). A deaeration process was conducted under the conditions of 150° C. and 20 min. The results are shown in Table 2.

(Method for Determining a Particle Size Distribution Index D50)

For each of pre-doping agents obtained in Examples and Comparative Examples, an average particle size (D50) was determined using a particle-size distribution analyzer (Microtrac MT-3000, from Nikkiso Co., Ltd.). Here, a medium was ethanol. The results are shown in Table 1.

(Method for Analyzing a Surface Composition by an X-Ray Photoelectron Analyzer)

For each of pre-doping agents obtained in Examples 23 and 31 to 33, element concentrations of C, O, Si and Fe from the uppermost surface to a depth of 1 nm were measured using an X-ray photoelectron analyzer (ESCA3400, from Shimadzu Corporation). A pre-doping agent was press-molded on a thin film and fixed on a sample table with a carbon tape for measurement. Correction was conducted at a C1s binding energy of 284.6 eV. Binding energy peaks of C1s, O1s, Si2p, and Fe2p were around 300, 530, 100, and 710 eV, respectively. An X-ray source was Mg-Kα ray; a filament voltage-current was 12 kV-15 mA; a vacuum degree was less than $1.0 \times 10^{-6}$ Pa; a cumulative number was 3; and element concentrations in % were determined.

[Evaluation of a Power Storage Device]

(Production of a Coin Type Battery for Electrochemical Evaluation)

A slurry was prepared in N-methylpyrrolidone such that 58 wt % of each of pre-doping agents obtained in Examples and Comparative Examples, 30 wt % of acetylene black ("DENKA BLACK", from Denka Company Limited) as a conductive assistant, and 12 wt % of polyvinylidene fluoride (PVDF, "KF polymer", from KUREHA CORPORATION) as a binding agent. The slurry was applied to an etching aluminum foil (JCC-20CB, from Japan Capacotpr Industrial Co., Ltd.) as a current collector, and dried at 130° C. for 5 min. The dried sheet was punched by a punching machine, to prepare an electrode (positive electrode) for evaluation. A counter electrode was metal lithium prepared by punching a metal lithium foil. a polypropylene separator was sandwiched between the electrode for evaluation and the opposite electrode to form an electrode, which was placed in a coin type battery case. A 1M electrolytic solution of $LiPF_6$ in a mixed solvent of ethylene carbonate (EC) and diethyl carbonate (DEC) with a volume ratio of EC:DEC=1:1 was poured, and then the battery case was sealed, to produce a coin type battery for electrochemical evaluation.

(Charge-Discharge Test)

The coin type battery thus produced was charged at a constant current to a charge termination voltage of 4.0 V at a current density of 8.67 mA/g (per active material weight), followed by constant voltage charging (termination condition: a current value of 0.867 mA/g (per active material weight)) and then 3 min resting step. Then, it was discharged at a constant current to a voltage of 2.3 V at a current density of 8.67 mA/g (per active material weight). A charging capacity, a discharge capacity and an irreversible capacity obtained are shown in Table 2.

For evaluation of the above battery properties, 10 coin type batteries were produced for one condition. From the number of short-circuited cells of 10 cells measured under the same conditions, a short-circuit rate was calculated and described in Table 2.

(Elution Amount of Metal Ions to an Electrolytic Solution)

To 18.0 g of a 1M electrolytic solution of $LiPF_6$ in a mixed solvent of ethylene carbonate (EC) and diethyl carbonate (DEC) with a volume ratio of EC:DEC=1:1 was added 2.0 g of each of pre-doping agents obtained in Examples and Comparative Examples, and the mixture was stored in a thermostat bath at 50° C. for one week. Then, the electrolytic solution was collected by a membrane filter, and dried in an alumina crucible at 100° C. for 24 hours, and subsequently calcined at 800° C. for 12 hours. Then, to the alumina crucible was added 3 mL of 35% hydrochloric acid, and the mixture was allowed to stand for 30 min or more, and then ion-exchanged water was added to be the total volume of 20 mL. Then, the mixture was diluted by 1000 times to give 100 mL of a test solution. An iron-ion concentrations in the test solution was determined by ICP optical emission spectrophotometry, and a proportion of iron ions eluted from the pre-doping agent was calculated as an iron-ion elution ratio by the following equation.

Iron-ion elution ratio %=Iron-ion concentration in a test solution [mg/L]×0.1[L]×1000×100/(2.0[g]× 1000[mg/g])

(Water Resistance Test)

In an aluminum container was weighed 2.0 g of each of pre-doping agents obtained in Examples and Comparative Example, and it was stored in a dry room with a dew point of −30° C. for one month. Weights before and after one month storage were measured, and a weight increase rate was calculated by the following equation. The lower the increase rate is, the higher water resistance is.

Water resistance %=(Weight after the test[g]/2.0[g]× 100)−100

TABLE 1

| | Li/Fe molar ratio | Lattice constant a Å | Lattice constant b Å | Lattice constant c Å | Lattice volume V Å$^3$ | Half width 2θ° | 144.6°/ 123.6° | 144.6°/ 128.5° | 143.5°/ 123.6° | Particle size distribution index D50 μm |
|---|---|---|---|---|---|---|---|---|---|---|
| Example 1 | 3.77 | 9.199 | 9.213 | 9.214 | 780.84 | 0.09 | 4 | 16 | 0 | 9 |
| Example 2 | 3.89 | 9.187 | 9.213 | 9.202 | 778.87 | 0.10 | 4 | 15 | 0 | 9 |
| Example 3 | 4.21 | 9.174 | 9.211 | 9.198 | 777.27 | 0.11 | 3 | 11 | 0 | 10 |
| Example 4 | 4.45 | 9.161 | 9.212 | 9.191 | 775.63 | 0.13 | 2 | 7 | 0 | 9 |
| Example 5 | 4.69 | 9.146 | 9.211 | 9.186 | 773.86 | 0.14 | 1 | 4 | 0 | 8 |
| Example 6 | 5.21 | 9.143 | 9.212 | 9.184 | 773.47 | 0.15 | 0 | 0 | 0 | 10 |
| Example 7 | 6.51 | 9.142 | 9.211 | 9.183 | 773.23 | 0.16 | 0 | 0 | 0 | 9 |
| Example 8 | 4.69 | 9.144 | 9.213 | 9.185 | 773.82 | 0.10 | 1 | 4 | 0 | 9 |
| Example 9 | 4.69 | 9.145 | 9.212 | 9.185 | 773.76 | 0.08 | 1 | 4 | 0 | 8 |
| Example 10 | 4.69 | 9.145 | 9.212 | 9.184 | 773.58 | 0.06 | 1 | 4 | 0 | 9 |
| Example 11 | 4.69 | 9.145 | 9.211 | 9.184 | 773.64 | 0.15 | 1 | 4 | 0 | 9 |
| Example 12 | 4.69 | 9.145 | 9.212 | 9.184 | 773.67 | 0.16 | 1 | 4 | 0 | 10 |
| Example 13 | 4.69 | 9.145 | 9.213 | 9.185 | 773.82 | 0.17 | 1 | 4 | 0 | 9 |
| Example 14 | 4.69 | 9.143 | 9.212 | 9.183 | 773.37 | 0.12 | 0 | 0 | 0 | 9 |
| Example 15 | 4.69 | 9.141 | 9.213 | 9.182 | 773.26 | 0.13 | 0 | 0 | 0 | 9 |
| Example 16 | 4.69 | 9.148 | 9.212 | 9.187 | 774.18 | 0.12 | 4 | 16 | 0 | 8 |
| Example 17 | 4.69 | 9.146 | 9.213 | 9.185 | 773.85 | 0.12 | 2 | 8 | 0 | 9 |
| Example 18 | 4.69 | 9.146 | 9.211 | 9.186 | 773.86 | 0.14 | 1 | 4 | 0 | 23 |
| Example 19 | 4.69 | 9.146 | 9.211 | 9.186 | 773.86 | 0.14 | 1 | 4 | 0 | 48 |
| Example 20 | 4.69 | 9.148 | 9.214 | 9.187 | 774.37 | 0.13 | 0 | 0 | 0 | 9 |
| Example 21 | 3.77 | 9.145 | 9.211 | 9.184 | 773.61 | 0.13 | 0 | 0 | 20 | 9 |
| Example 22 | 4.21 | 9.146 | 9.211 | 9.186 | 773.86 | 0.13 | 0 | 0 | 11 | 9 |
| Example 23 | 4.69 | 9.147 | 9.212 | 9.185 | 773.95 | 0.13 | 0 | 0 | 5 | 9 |
| Example 24 | 5.00 | 9.145 | 9.213 | 9.187 | 774.03 | 0.12 | 0 | 0 | 0 | 9 |
| Example 25 | 5.21 | 9.147 | 9.211 | 9.186 | 773.95 | 0.12 | 0 | 0 | 0 | 9 |
| Example 26 | 6.51 | 9.149 | 9.211 | 9.184 | 773.95 | 0.11 | 0 | 0 | 0 | 9 |
| Example 27 | 4.69 | 9.146 | 9.211 | 9.186 | 773.86 | 0.05 | 0 | 0 | 2 | 9 |
| Example 28 | 4.69 | 9.147 | 9.212 | 9.185 | 773.95 | 0.17 | 0 | 0 | 19 | 9 |
| Example 29 | 4.69 | 9.145 | 9.213 | 9.187 | 774.03 | 0.12 | 0 | 0 | 5 | 9 |
| Example 30 | 4.69 | 9.146 | 9.211 | 9.186 | 773.86 | 0.12 | 0 | 0 | 4 | 9 |
| Example 31 | 4.69 | 9.147 | 9.211 | 9.185 | 773.86 | 0.13 | 0 | 0 | 5 | 9 |
| Example 32 | 4.69 | 9.149 | 9.211 | 9.184 | 773.95 | 0.13 | 0 | 0 | 5 | 9 |
| Example 33 | 4.69 | 9.147 | 9.211 | 9.185 | 773.86 | 0.13 | 0 | 0 | 5 | 9 |
| Comparative Example 1 | 3.41 | 9.211 | 9.211 | 9.226 | 782.77 | 0.05 | 8 | 20 | 0 | 8 |
| Comparative Example 2 | 7.08 | 9.138 | 9.213 | 9.179 | 772.74 | 0.18 | 0 | 0 | 0 | 9 |
| Comparative Example 3 | 4.69 | 9.148 | 9.214 | 9.186 | 774.28 | 0.13 | 10 | 24 | 0 | 8 |

TABLE 1-continued

|  | Li/Fe molar ratio | Lattice constant a Å | Lattice constant b Å | Lattice constant c Å | Lattice volume V Å³ | Half width 2θ=20° | 144.6°/ 123.6° | 144.6°/ 128.5° | 143.5°/ 123.6° | Particle size distribution index D50 μm |
|---|---|---|---|---|---|---|---|---|---|---|
| Comparative Example 4 | 4.69 | 9.138 | 9.213 | 9.172 | 772.18 | 0.21 | 0 | 0 | 0 | 10 |
| Comparative Example 5 | 3.41 | 9.146 | 9.211 | 9.186 | 773.86 | 0.06 | 0 | 0 | 24 | 9 |
| Comparative Example 6 | 7.08 | 9.147 | 9.212 | 9.185 | 773.95 | 0.17 | 0 | 0 | 0 | 9 |
| Comparative Example 7 | 5.00 | 9.145 | 9.211 | 9.184 | 773.61 | 0.18 | 0 | 0 | 27 | 9 |
| Comparative Example 8 | 4.69 | 9.146 | 9.211 | 9.186 | 773.86 | 0.22 | 0 | 0 | 0 | 9 |

TABLE 2

|  | Specific surface area m²/g | Volume resistivity Ω·cm | Irreversible capacity mAh/g | Charge capacity mAh/g | Discharge capacity mAh/g | x | y | Iron-ion elution ratio wt % | Short-circuit rate % | Water resistance % |
|---|---|---|---|---|---|---|---|---|---|---|
| Example 1 | 2.1 | $2.44 \times 10^{13}$ | 448 | 489 | 41 | 3.77 | 3.39 | 0.08 | 0 | 0.4 |
| Example 2 | 1.9 | $4.51 \times 10^{13}$ | 463 | 508 | 45 | 3.89 | 3.45 | 0.08 | 0 | 0.4 |
| Example 3 | 1.6 | $6.38 \times 10^{13}$ | 516 | 568 | 52 | 4.21 | 3.61 | 0.06 | 0 | 0.4 |
| Example 4 | 1.3 | $4.29 \times 10^{14}$ | 540 | 594 | 54 | 4.45 | 3.73 | 0.04 | 0 | 0.4 |
| Example 5 | 1.2 | $4.81 \times 10^{14}$ | 567 | 623 | 56 | 4.69 | 3.85 | 0.02 | 0 | 0.4 |
| Example 6 | 0.9 | $2.31 \times 10^{15}$ | 496 | 549 | 53 | 5.21 | 4.11 | 0.01 | 0 | 0.4 |
| Example 7 | 0.6 | $5.82 \times 10^{15}$ | 450 | 498 | 48 | 6.51 | 4.76 | 0.01 | 0 | 0.4 |
| Example 8 | 1.0 | $2.65 \times 10^{14}$ | 553 | 607 | 54 | 4.69 | 3.85 | 0.02 | 0 | 0.4 |
| Example 9 | 0.6 | $3.11 \times 10^{14}$ | 543 | 597 | 54 | 4.69 | 3.85 | 0.02 | 0 | 0.4 |
| Example 10 | 0.3 | $3.19 \times 10^{14}$ | 538 | 591 | 53 | 4.69 | 3.85 | 0.02 | 0 | 0.4 |
| Example 11 | 1.4 | $6.79 \times 10^{14}$ | 531 | 582 | 51 | 4.69 | 3.85 | 0.02 | 0 | 0.4 |
| Example 12 | 1.7 | $5.32 \times 10^{14}$ | 525 | 569 | 44 | 4.69 | 3.85 | 0.02 | 0 | 0.4 |
| Example 13 | 2.0 | $4.13 \times 10^{15}$ | 515 | 555 | 40 | 4.69 | 3.85 | 0.02 | 0 | 0.4 |
| Example 14 | 1.3 | $2.98 \times 10^{15}$ | 537 | 591 | 54 | 4.69 | 3.85 | 0.01 | 0 | 0.4 |
| Example 15 | 1.2 | $7.25 \times 10^{14}$ | 512 | 563 | 51 | 4.69 | 3.85 | 0.01 | 0 | 0.4 |
| Example 16 | 1.2 | $3.87 \times 10^{13}$ | 511 | 551 | 40 | 4.69 | 3.85 | 0.08 | 0 | 0.4 |
| Example 17 | 1.2 | $7.49 \times 10^{13}$ | 513 | 555 | 42 | 4.69 | 3.85 | 0.04 | 0 | 0.4 |
| Example 18 | 1.2 | $4.81 \times 10^{14}$ | 545 | 596 | 51 | 4.69 | 3.85 | 0.02 | 10 | 0.4 |
| Example 19 | 1.2 | $4.81 \times 10^{14}$ | 493 | 536 | 43 | 4.69 | 3.85 | 0.02 | 20 | 0.4 |
| Example 20 | 1.2 | $2.95 \times 10^{14}$ | 558 | 615 | 57 | 4.69 | 3.85 | 0.01 | 0 | 0.4 |
| Example 21 | 2.0 | $8.88 \times 10^{6}$ | 352 | 394 | 42 | 3.77 | 3.39 | 0.01 | 0 | 0.5 |
| Example 22 | 1.8 | $1.82 \times 10^{7}$ | 410 | 460 | 50 | 4.21 | 3.61 | 0.01 | 0 | 0.5 |
| Example 23 | 1.7 | $6.45 \times 10^{6}$ | 631 | 683 | 52 | 4.69 | 3.85 | 0.00 | 0 | 0.5 |
| Example 24 | 1.5 | $8.62 \times 10^{5}$ | 702 | 756 | 54 | 5.00 | 4.00 | 0.00 | 0 | 0.5 |
| Example 25 | 1.3 | $9.33 \times 10^{5}$ | 578 | 630 | 52 | 5.2 | 4.11 | 0.00 | 0 | 0.5 |
| Example 26 | 1.2 | $9.21 \times 10^{5}$ | 480 | 528 | 48 | 6.5 | 4.76 | 0.00 | 0 | 0.5 |
| Example 27 | 0.2 | $8.09 \times 10^{7}$ | 382 | 409 | 27 | 4.69 | 3.85 | 0.00 | 0 | 0.5 |
| Example 28 | 1.8 | $1.02 \times 10^{7}$ | 330 | 382 | 52 | 4.69 | 3.85 | 0.00 | 0 | 0.5 |
| Example 29 | 1.0 | $4.86 \times 10^{5}$ | 605 | 654 | 49 | 4.69 | 3.85 | 0.00 | 0 | 0.5 |
| Example 30 | 0.9 | $1.87 \times 10^{6}$ | 582 | 628 | 46 | 4.69 | 3.85 | 0.00 | 0 | 0.5 |
| Example 31 | 1.0 | $4.55 \times 10^{5}$ | 601 | 657 | 56 | 4.69 | 3.85 | 0.00 | 0 | 0.1 |
| Example 32 | 0.9 | $7.34 \times 10^{5}$ | 612 | 664 | 52 | 4.69 | 3.85 | 0.00 | 0 | 0.1 |
| Example 33 | 1.3 | $5.19 \times 10^{5}$ | 595 | 647 | 52 | 4.69 | 3.85 | 0.00 | 0 | 0.1 |
| Comparative Example 1 | 2.3 | $8.95 \times 10^{4}$ | 419 | 456 | 37 | 3.21 | 3.11 | 0.16 | 60 | 0.4 |
| Comparative Example 2 | 0.5 | $3.51 \times 10^{14}$ | 191 | 223 | 32 | 7.08 | 5.04 | 0.01 | 0 | 0.4 |
| Comparative Example 3 | 1.5 | $6.97 \times 10^{3}$ | 548 | 603 | 55 | 4.69 | 3.85 | 0.19 | 80 | 0.4 |
| Comparative Example 4 | 0.9 | $6.31 \times 10^{14}$ | 299 | 333 | 34 | 4.69 | 3.85 | 0.01 | 0 | 0.4 |
| Comparative Example 5 | 2.2 | $3.86 \times 10^{7}$ | 301 | 340 | 39 | 3.41 | 3.21 | 0.01 | 0 | 0.5 |
| Comparative Example 6 | 0.7 | $1.37 \times 10^{6}$ | 164 | 202 | 38 | 7.08 | 5.04 | 0.00 | 0 | 0.5 |
| Comparative Example 7 | 1.9 | $1.15 \times 10^{8}$ | 230 | 272 | 42 | 5.00 | 4.00 | 0.00 | 0 | 0.5 |
| Comparative Example 8 | 0.8 | $5.29 \times 10^{5}$ | 292 | 332 | 40 | 4.69 | 3.85 | 0.00 | 0 | 0.5 |

(Production of a Lithium Ion Capacitor and Pre-Doping)

Using pre-doping agents obtained in Examples and Comparative Examples, lithium ion capacitors were produced and pre-doping was conducted. In a process for producing a lithium ion capacitor, unless otherwise stated, it was produced under nitrogen atmosphere.

Production Example 1

(Production of a Positive Electrode)

First, activated carbon ("Kuraray Coal", from Kuraray Co., Ltd.) as a positive-electrode active material, a pre-doping agent of Example 1 as a pre-doping agent, acetylene black ("DENKA BLACK", from Denka Company Limited) as a conductive assistant, and polyvinylidene fluoride (PVDF, "KF polymer", from KUREHA CORPORATION) as a binding agent were dissolved in N-methylpyrrolidone to prepare a positive electrode paint.

Here, a content of the pre-doping agent was adjusted to be 23% based on the total mass of a positive-electrode active material and a pre-doping agent, as represented by the following equation.

Content of a pre-doping agent (%)=[Mass of a pre-doping agent/(mass of a positive-electrode active material+mass of a pre-doping agent)]×100

Furthermore, a mass ratio of the total of the positive-electrode active material and the pre-doping agent/the conductive assistant/the binding agent was adjusted to be 77/14/9. That is, a mass ratio of the positive-electrode active material/the pre-doping agent/the conductive assistant/the binding agent was adjusted to be 59.3/17.7/14/9.

Finally, the positive electrode paint prepared was applied to an etching aluminum foil ("JCC-20CB", from Japan Capacotpr Industrial Co., Ltd.) as a current collector, dried at 130° C. for 5 min, and cut into a size of 3 cm×4 cm to give a positive electrode. Here, a designed capacity was 2.3 mAh.

(Production of a Negative Electrode)

A spherulitic graphite electrode ("HS-LIB-N-Gr-001", from Hohsen Corp., nominal capacity: 1.6 mAh/cm$^2$) as a negative electrode was cut into a size of 3.3 cm×4.3 cm to give a negative electrode. Here, a designed capacity was 22.7 mAh.

(Production of a Lithium Ion Capacitor)

The positive electrode and the negative electrode produced above and a separator (from Nippon Kodoshi Corporation) were laminated and put in an aluminum laminate case.

Subsequently, a 1M solution of LiPF$_6$ in EC/DEC=1/1 (from Kishida Chemical Co., Ltd.) as an electrolytic solution was injected, and the case was vacuum-sealed, to produce a lithium ion capacitor of Production Example 1.

An electric capacity of the positive electrode in the lithium ion capacitor of Production Example 1 was 2.3 mAh; an electric capacity of the negative electrode was 22.7 mAh; and a volume ratio of positive/negative electrodes (negative electrode/positive electrode) was 9.9.

(Pre-doping)

Using a charge-discharge system (from Hokuto Denko Corporation), the lithium ion capacitor of Production Example 1 produced was charged at a constant current under a temperature of 25° C. to 3.9 V at a current density of 0.02 mA/cm$^2$, followed by constant voltage charging (termination condition: a current value of 0.002 mA/cm$^2$) and then 3 min resting step. Then it was discharged to 2.2 V, to finish pre-doping.

Production Examples 2 to 20 and 25 to 37

Lithium ion capacitors of Production Example 2 to 20 and 25 to 37 were produced as described in Production Example 1, except that a pre-doping agent in production of a positive electrode was changed as shown in Table 3, and pre-doping was conducted.

Production Example 21

A lithium ion capacitor of Production Example 21 was produced as described in Production Example 1, except that a pre-doping agent of Example 5 was used in production of a positive electrode, and a content of the pre-doping agent was adjusted to be 40% based on the total mass of a positive-electrode active material and the pre-doping agent, and pre-doping was conducted. That is, a mass ratio of a positive-electrode active material/a pre-doping agent/a conductive assistant/binding agent was adjusted to be 46.2/30.8/14/9.

Production Example 22

(Production of a Negative Electrode)

In N-methylpyrrolidone were dissolved silicon (from FUJIFILM Wako Pure Chemical Corporation) as a negative electrode active material, acetylene black ("DENKA BLACK", from Denka Company Limited) as a conductive assistant, and polyvinylidene fluoride (PVDF, "KF polymer", from KUREHA CORPORATION) as a binding agent to prepare a paint for a negative electrode. A mass ratio of a negative electrode active material/a conductive assistant/a binding agent was adjusted to be 50/25/25.

Subsequently, the paint for a negative electrode prepared was applied to a copper foil (from Fukuda Metal Foil & Powder Co., Ltd.) as a current collector, dried at 130° C. for 5 min, and then cut into a size of 3.3 cm×4.3 cm to give a negative electrode. Here, a designed capacity was 22.7 mAh.

A lithium ion capacitor of Production Example 22 was produced as described in Production Example 5, except that a negative electrode was changed to the above electrode, and pre-doping was conducted.

Comparative Production Examples 1 to 4 and 7 to 10

Lithium ion capacitors of Comparative Production Examples 1 to 4 and 7 to 10 were produced as described in Production Example 1, except that a pre-doping agent in production of a positive electrode was changed as shown in Table 3, and pre-doping was conducted.

(Production of a Lithium Ion Battery and Pre-Doping)

Lithium ion batteries were produced using the pre-doping agents obtained in Examples and Comparative Examples, and pre-doping was conducted.

Production Example 23

(Production of a Positive Electrode)

First, In N-methylpyrrolidone were dissolved Li(Ni$_{0.8}$Co$_{0.1}$Mn$_{0.1}$)O$_2$ (from Hohsen Corp.) as a positive-electrode active material, the pre-doping agent of Example 5 as a pre-doping agent, acetylene black ("DENKA BLACK", from Denka Company Limited) as a conductive assistant, and polyvinylidene fluoride (PVDF, "KF polymer", from KUREHA CORPORATION) as a binding agent, to prepare a paint for a positive electrode.

A pre-doping agent content was adjusted to be 7% based on the total mass of the positive-electrode active material and the pre-doping agent as represented by the following calculating formula.

Content of a pre-doping agent (%)=[Mass of a pre-doping agent/(Mass of a positive-electrode active material+Mass of a pre-doping agent)]×100

A mass ratio of the total of a positive-electrode active material and a pre-doping agent/a conductive assistant/a binding agent was adjusted to be 83/11/6. That is, a mass ratio of a positive-electrode active material/a pre-doping agent/a conductive assistant/a binding agent was adjusted to be 77/6/11/6.

Finally, the paint for a positive electrode prepared was applied to an etching aluminum foil ("JCC-20CB", from Japan Capacotpr Industrial Co., Ltd.) as a current collector, dried at 130° C. for 5 min, and cut into a size of 3 cm×4 cm, to produce a positive electrode. Here, a designed capacity was 8.2 mAh.

(Production of a Negative Electrode)

First, in N-methylpyrrolidone were dissolved silicon ("sil-grain e-si", from Elkem AS) as a negative electrode active material, acetylene black ("DENKA BLACK", from Denka Company Limited) as a conductive assistant, and polyvinylidene fluoride (PVDF, "KF polymer", from KUREHA CORPORATION) as a binding agent, to prepare a paint for a negative electrode.

A mass ratio of a negative electrode active material/a conductive assistant/a binding agent was adjusted to be 50/25/25.

Finally, the paint for a negative electrode prepared was applied to a copper foil (from Fukuda Metal Foil & Powder Co., Ltd.) as a current collector, dried at 130° C. for 5 min, and cut into a size of 3.3 cm×4.3 cm, to produce a negative electrode. Here, a designed capacity was 12.7 mAh.

(Production of a Lithium Ion Battery)

The positive electrode and the negative electrode produced above and a polyethylene separator were laminated and put in an aluminum laminate case.

Subsequently, a 1M solution of $LiPF_6$ in PC (from Kishida Chemical Co., Ltd.) as an electrolytic solution was injected, and the case was vacuum-sealed, to produce a lithium ion battery of Production Example 23.

An electric capacity of the positive electrode in the lithium ion battery of Production Example 23 was 8.2 mAh; an electric capacity of the negative electrode was 12.7 mAh; and a volume ratio of positive/negative electrodes (negative electrode/positive electrode) was 1.5.

(Pre-doping)

Using a charge-discharge system (from Hokuto Denko Corporation), the lithium ion battery of Production Example 23 produced was charged at a constant current under a temperature of 25° C. to 4.2 V at a current density of 0.02 $mA/cm^2$, followed by constant voltage charging (termination condition: a current value of 0.002 $mA/cm^2$) and then 3 min resting step. Then it was discharged to 3.2 V, to finish pre-doping.

Production Example 24

A lithium ion battery of Production Example 24 was produced as described in Production Example 23, except that in production of a positive electrode, a pre-doping agent of Example 5 was used, and a content of the pre-doping agent was adjusted to be 12% based on the total mass of a positive-electrode active material and a pre-doping agent, and pre-doping was conducted. That is, a mass ratio of a positive-electrode active material/a pre-doping agent/a conductive assistant/a binding agent was adjusted to be 73/10/11/6.

Production Example 38

A lithium ion battery of Production Example 38 was produced as described in Production Example 23, except that in production of a positive electrode, a pre-doping agent was changed as shown in Table 3, and pre-doping was conducted.

Comparative Production Example 5

A lithium ion battery of Comparative Production Example 5 was produced as described in Production Example 23, except that in production of a positive electrode, a pre-doping agent was changed as shown in Table 3, and pre-doping was conducted.

Comparative Production Example 6

A lithium ion battery of Comparative Production Example 6 was produced as described in Production Example 24, except that in production of a positive electrode, a pre-doping agent was changed as shown in Table 3, and pre-doping was conducted.

(Measurement of a Charging Depth)

A charging depth of a graphite or silicon negative electrode after pre-doping was conducted as described below. Lithium ion capacitors after discharging to 2.2 V in Production Examples 1 to 22 and 25 to 37, and Comparative Production Examples 1 to 4 and 7 to 10 were disassembled and graphite or silicon negative electrodes were taken out to be used as electrodes for evaluation. A counter electrode was metal lithium and a polypropylene separator was sandwiched between the electrode for evaluation and the counter electrode to form an electrode, which was then placed in a coin type battery case. A 1M electrolytic solution of $LiPF_6$ in a mixed solvent of ethylene carbonate (EC) and diethyl carbonate (DEC) with a volume ratio of EC:DEC=1:1 was poured into the battery case, and then the battery case was sealed, to produce a coin type battery for electrochemical evaluation. The coin type battery for electrochemical evaluation was charged to 3.0 V to determine a charging depth.

Here, a charging depth is a value indicating that a charging capacity measured by the above charging process corresponds to how many % of a designed capacity of the negative electrode (22.7 mAh) and is calculated by the following calculation formula.

Charging depth (%)=[Charging capacity (mAh)/Designed capacity of a negative electrode (22.7 (mAh))]×100

(Evaluation of Capacitor Properties (Discharge Capacity))

Capacity properties (discharge capacity) of lithium ion capacitors of Production Examples 1 to 22 and 25 to 37 and Comparative Production Examples 1 to 4 and 7 to 10. Specifically, using a charge-discharge system (from Hokuto Denko Corporation), charging-discharging was conducted within a range of 2.2 to 3.8 V under a temperature of 25° C. A charge and discharge rate was 1C per a weight of a positive-electrode active material. A current density at a charge and discharge rate of 1C was 40 mA/g (per a weight of the active material).

For evaluation of the above battery properties, 10 capacitor cells were produced for one condition. From the number of short-circuited cells of 10 cells measured, a short-circuit rate was calculated and described in Table 3.

(Measurement of a Charging Depth)

A charging depth of a silicon negative electrode after pre-doping was conducted as described below. Lithium ion batteries after discharging to 3.2 V in Production Examples 23 to 24 and 38 and Comparative Production Examples 5 and 6 were disassembled and silicon negative electrodes were taken out to be used as electrodes for evaluation. A counter electrode was metal lithium and a polypropylene separator was sandwiched between the electrode for evaluation and the counter electrode to form an electrode, which was then placed in a coin type battery case. A 1M electrolytic solution of $LiPF_6$ in a propylene carbonate (PC) solvent was poured into the battery case, and then the battery case was sealed, to produce a coin type battery for electrochemical evaluation. The coin type battery for electrochemical evaluation was charged to 3.0 V to determine a charging depth.

Here, a charging depth is a value indicating that a charging capacity measured by the above charging process corresponds to how many % of a designed capacity of the negative electrode (12.7 mAh) and is calculated by the following calculation formula.

Charging depth (%)=[Charging capacity (mAh)/Designed capacity of a negative electrode (12.7 (mAh))]×100

(Evaluation of Battery Properties (Discharge Capacity))

Battery properties (discharge capacity) of lithium ion batteries of Production Examples 23 to 24 and 38 and Comparative Production Examples 5 and 6. Specifically, using a charge-discharge system (from Hokuto Denko Corporation), charging-discharging was conducted within a range of 3.2 to 4.2 V under a temperature of 25° C. A charge and discharge rate was 1C per a weight of a positive-electrode active material. A current density at a charge and discharge rate of 1C was 160 mA/g (per a weight of the active material).

For evaluation of the above battery properties, 10 batteries were produced for one condition. From the number of short-circuited cells of 10 cells measured, a short-circuit rate was calculated and described in Table 3.

TABLE 3

| | Pre-doping agent | Charging depth % | Discharge capacity mAh | Short-circuit rate % |
|---|---|---|---|---|
| Production Example 1 | Example 1 | 31 | 2.3 | 0 |
| Production Example 2 | Example 2 | 31 | 2.3 | 0 |
| Production Example 3 | Example 3 | 35 | 2.3 | 0 |
| Production Example 4 | Example 4 | 37 | 2.3 | 0 |
| Production Example 5 | Example 5 | 38 | 2.3 | 0 |
| Production Example 6 | Example 6 | 34 | 2.3 | 0 |
| Production Example 7 | Example 7 | 31 | 2.3 | 0 |
| Production Example 8 | Example 8 | 37 | 2.3 | 0 |
| Production Example 9 | Example 9 | 37 | 2.3 | 0 |
| Production Example 10 | Example 10 | 37 | 2.3 | 0 |
| Production Example 11 | Example 11 | 36 | 2.3 | 0 |
| Production Example 12 | Example 12 | 36 | 2.3 | 0 |
| Production Example 13 | Example 13 | 35 | 2.3 | 0 |
| Production Example 14 | Example 14 | 37 | 2.3 | 0 |
| Production Example 15 | Example 15 | 35 | 2.3 | 0 |
| Production Example 16 | Example 16 | 35 | 2.3 | 0 |
| Production Example 17 | Example 17 | 35 | 2.3 | 0 |
| Production Example 18 | Example 18 | 37 | 2.3 | 10 |
| Production Example 19 | Example 19 | 34 | 2.3 | 10 |
| Production Example 20 | Example 20 | 37 | 2.3 | 0 |
| Production Example 21 | Example 5 | 67 | 2.3 | 0 |
| Production Example 22 | Example 5 | 34 | 2.3 | 0 |
| Production Example 23 | Example 5 | 21 | 8.2 | 0 |
| Production Example 24 | Example 5 | 37 | 8.2 | 0 |
| Production Example 25 | Example 21 | 28 | 2.1 | 0 |
| Production Example 26 | Example 22 | 30 | 2.3 | 0 |
| Production Example 27 | Example 23 | 38 | 2.3 | 0 |
| Production Example 28 | Example 24 | 44 | 2.3 | 0 |
| Production Example 29 | Example 25 | 38 | 2.3 | 0 |
| Production Example 30 | Example 26 | 33 | 2.3 | 0 |
| Production Example 31 | Example 27 | 29 | 2.2 | 0 |
| Production Example 32 | Example 28 | 27 | 2 | 0 |
| Production Example 33 | Example 29 | 39 | 2.3 | 0 |
| Production Example 34 | Example 30 | 38 | 2.3 | 0 |
| Production Example 35 | Example 31 | 26 | 2.3 | 0 |
| Production Example 36 | Example 32 | 39 | 2.3 | 0 |
| Production Example 37 | Example 33 | 39 | 2.3 | 0 |
| Production Example 38 | Example 24 | 46 | 8.2 | 0 |
| Comparative Production Example 1 | Comparative Example 1 | 28 | 2.1 | 40 |
| Comparative Production Example 2 | Comparative Example 2 | 14 | 1.1 | 0 |
| Comparative Production Example 3 | Comparative Example 3 | 37 | 2.3 | 60 |
| Comparative Production Example 4 | Comparative Example 4 | 23 | 1.8 | 0 |
| Comparative Production Example 5 | Comparative Example 2 | 8 | 7.4 | 0 |
| Comparative Production Example 6 | Comparative Example 3 | 34 | 8.2 | 60 |
| Comparative Production Example 7 | Comparative Example 5 | 24 | 1.9 | 0 |

TABLE 3-continued

| | Pre-doping agent | Charging depth % | Discharge capacity mAh | Short-circuit rate % |
|---|---|---|---|---|
| Comparative Production Example 8 | Comparative Example 6 | 17 | 1.3 | 0 |
| Comparative Production Example 9 | Comparative Example 7 | 21 | 1.7 | 0 |
| Comparative Production Example 10 | Comparative Example 8 | 24 | 1.9 | 0 |

The invention claimed is:

1. A pre-doping agent for a power storage device comprising a lithium iron oxide represented by Formula (1), wherein in X-ray diffractometry, a half width of a diffraction peak at a diffraction angle (2θ) of 23.6±0.5° is 0.06 to 0.17°, and an intensity ratio (I44.6/I23.6) of a diffraction peak intensity (I44.6) at a diffraction angle (2θ) of 44.6±0.5° to a diffraction peak intensity (I23.6) at a diffraction angle (2θ) of 23.6±0.5° is 2% or less:

$$Li_xFeO_y \quad (1)$$

wherein x meets 3.5≤x≤7.0 and y meets 3.1≤y≤5.0.

2. The pre-doping agent for a power storage device according to claim 1, wherein after storing a mixture prepared by adding 2.0 g of the pre-doping agent to 18.0 g of an electrolytic solution prepared by dissolving LiPF6 to 1 mol/L in a 1:1 volume-ratio (EC:DEC) mixed solvent of ethylene carbonate(EC) and diethyl carbonate (DEC) in a thermostat bath at 50° C. for one week, an iron-ion elution ratio is 0.01 to 0.10 wt % based on the weight of the pre-doping agent before addition.

3. The pre-doping agent according to claim 1, wherein the pre-doping agent has a specific surface area of 0.05 to 2.2 m2/g.

4. The pre-doping agent according to claim 1, wherein the pre-doping agent is coated with at least one coating material selected from the group consisting of an organosilicon compound, a fatty acid, lithium carbonate and a carbonaceous material.

5. A positive electrode for a power storage device, comprising the pre-doping agent according to claim 1 and a positive-electrode active material.

6. The positive electrode according to claim 5, comprising the pre-doping agent in a content of 1 to 60% by weight based on the total weight of the pre-doping agent and the positive-electrode active material.

7. A power storage device comprising the positive electrode according to claim 5 as a constituent.

8. A method for producing a pre-doping agent for a power storage device according to claim 1 comprising a lithium iron oxide prepared by mixing and calcining an iron material and a lithium material, comprising mixing the iron material and the lithium material, calcining the mixture in an inert gas atmosphere with an oxygen concentration of 1 to 52000 ppm at 650 to 1050° C. for 2 to 100 hours to give a powdery product, and pulverizing the powdery product to give the lithium iron oxide.

9. The method for producing a pre-doping agent for a power storage device according to claim 8, wherein a further carbon material is mixed with the iron material and the lithium material.

10. A pre-doping agent for a power storage device comprising a lithium iron oxide represented by Formula (1), wherein in X-ray diffractometry, a half width of a diffraction peak at a diffraction angle (2θ) of 23.6±0.5° is 0.06 to 0.17°, and when 5% by weight of Si powder as an internal standard substance is added to the pre-doping agent, an intensity ratio (I44.6/I28.5) of a diffraction peak intensity (I44.6) at a diffraction angle (2θ) of 44.6±0.5° to a diffraction peak intensity (I28.5) at a diffraction angle (2θ) of 28.5±0.5° is 7% or less:

$$Li_xFeO_y \quad (1)$$

wherein x meets 3.5≤x≤7.0 and y meets 3.1≤y≤5.0.

11. The pre-doping agent according to claim 10, wherein after storing a mixture prepared by adding 2.0 g of the pre-doping agent to 18.0 g of an electrolytic solution prepared by dissolving LiPF6 to 1 mol/L in a 1:1 volume-ratio (EC:DEC) mixed solvent of ethylene carbonate(EC) and diethyl carbonate (DEC) in a thermostat bath at 50° C. for one week, an iron-ion elution ratio is 0.01 to 0.10 wt % based on the weight of the pre-doping agent before addition.

12. The pre-doping agent according to claim 10, wherein the pre-doping agent has a specific surface area of 0.05 to 2.2 m2/g.

13. The pre-doping agent according to claim 10, wherein the pre-doping agent is coated with at least one coating material selected from the group consisting of an organosilicon compound, a fatty acid, lithium carbonate and a carbonaceous material.

14. A positive electrode for a power storage device, comprising the pre-doping according to claim 10 and a positive-electrode active material.

15. The positive electrode according to claim 14, comprising the pre-doping agent in a content of 1 to 60% by weight based on the total weight of the pre-doping agent and the positive-electrode active material.

16. A power storage device comprising the positive electrode according to claim 14 as a constituent.

17. A method for producing a pre-doping agent for a power storage device according to claim 10 comprising a lithium iron oxide prepared by mixing and calcining an iron material and a lithium material, comprising mixing the iron material and the lithium material, calcining the mixture in an inert gas atmosphere with an oxygen concentration of 1 to 52000 ppm at 650 to 1050° C. for 2 to 100 hours to give a powdery product, and pulverizing the powdery product to give the lithium iron oxide.

18. The method for producing a pre-doping agent for a power storage device according to claim 17, wherein a further carbon material is mixed with the iron material and the lithium material.

* * * * *